US010159242B2

(12) United States Patent
Abouelmakarem

(10) Patent No.: US 10,159,242 B2
(45) Date of Patent: Dec. 25, 2018

(54) ELECTRICALLY CONTROLLED MOVABLE TREE STAND FOR SUPPORTING A PERSON

(71) Applicant: Kadry Abouelmakarem, Wappingers Falls, NY (US)

(72) Inventor: Kadry Abouelmakarem, Wappingers Falls, NY (US)

(*) Notice: Subject to any disclaimer, the term of this patent is extended or adjusted under 35 U.S.C. 154(b) by 0 days.

(21) Appl. No.: 15/634,847

(22) Filed: Jun. 27, 2017

(65) Prior Publication Data

US 2018/0055040 A1    Mar. 1, 2018

Related U.S. Application Data

(63) Continuation-in-part of application No. 15/244,215, filed on Aug. 23, 2016, now Pat. No. 9,717,232.

(51) Int. Cl.
| | |
|---|---|
| E04C 1/00 | (2006.01) |
| A01M 31/02 | (2006.01) |
| A61G 5/10 | (2006.01) |
| B66F 11/04 | (2006.01) |

(52) U.S. Cl.
CPC ............ *A01M 31/02* (2013.01); *A61G 5/104* (2013.01); *B66F 11/04* (2013.01)

(58) Field of Classification Search
CPC ......... A01M 31/02; A61G 5/104; B66F 11/04
See application file for complete search history.

(56) References Cited

U.S. PATENT DOCUMENTS

| | | | | |
|---|---|---|---|---|
| 4,329,928 A | * | 5/1982 | Shaw | A47B 51/00 108/106 |
| 5,312,218 A | | 5/1994 | Pratt | |
| 5,595,265 A | * | 1/1997 | Lebrocquy | A01M 31/02 187/244 |
| 5,850,892 A | * | 12/1998 | Citron | B66F 11/04 182/148 |
| 5,927,440 A | | 7/1999 | Freeman | |
| 5,950,846 A | * | 9/1999 | Duane | A47B 47/022 108/108 |
| 6,095,284 A | | 8/2000 | Smith | |
| 7,281,607 B1 | | 10/2007 | Kirlay | |
| 7,500,573 B1 | * | 3/2009 | Flynn | B68B 9/00 211/85.11 |
| 7,823,694 B2 | | 11/2010 | Motes | |
| 7,942,244 B2 | | 5/2011 | Lombard | |
| 8,079,444 B1 | | 12/2011 | Rands et al. | |
| 8,505,688 B2 | | 8/2013 | Campbell | |
| 8,708,104 B1 | | 4/2014 | Sponsler | |
| D704,914 S | * | 5/2014 | Campbell | D34/28 |

(Continued)

*Primary Examiner* — Jerry E Redman
(74) *Attorney, Agent, or Firm* — Leason Ellis LLP

(57) ABSTRACT

A motorized tree stand includes a frame assembly for attachment to a tree. The frame assembly includes a rear wall that includes a vertical drive track and at least one vertical gliding rail spaced laterally therefrom. A seat assembly is operatively coupled to the rear wall of the frame assembly and provides a seat on which a user can sit. A first drive assembly is coupled to the seat assembly and includes a ball screw drive mechanism to controllably move the seat assembly in a vertical direction along the frame assembly. A second drive assembly can be coupled to a swivel plate for controllably moving the swivel plate resulting in swiveling of the seat assembly relative to the frame assembly. A controller and a power source are also provided.

16 Claims, 29 Drawing Sheets

(56) References Cited

U.S. PATENT DOCUMENTS

Figure 3A:
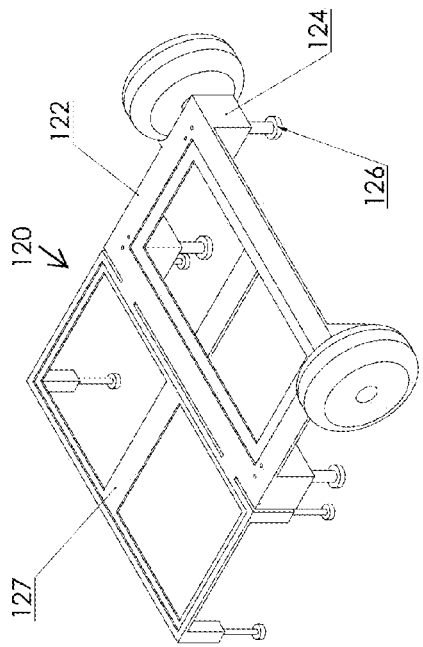

| | | |
|---|---|---|
| 8,775,001 B2 | 7/2014 | Phillips et al. |
| 9,717,232 B1* | 8/2017 | Abouelmakarem .. A01M 31/02 |
| 2003/0127261 A1 | 7/2003 | Borroni-Bird et al. |
| 2005/0082119 A1* | 4/2005 | Graham, Sr. .......... A63B 27/00 |
| | | 182/187 |
| 2006/0011351 A1* | 1/2006 | Lambert ................ B66F 11/04 |
| | | 166/379 |
| 2007/0095611 A1* | 5/2007 | Oertwig ................ A01M 31/02 |
| | | 182/142 |
| 2007/0169996 A1* | 7/2007 | Blue .................... A01M 31/02 |
| | | 182/141 |
| 2009/0236179 A1 | 9/2009 | Lopez |
| 2011/0297481 A1 | 12/2011 | Copus |
| 2011/0308887 A1 | 12/2011 | Johnson |
| 2014/0202796 A1 | 7/2014 | Sponsler |
| 2016/0016771 A1* | 1/2016 | Whitaker ............... B66F 11/04 |
| | | 182/63.1 |
| 2017/0166426 A1* | 6/2017 | Lonardi ................ B66F 11/04 |
| 2018/0016851 A1* | 1/2018 | Reddy ................... B66F 11/04 |

* cited by examiner

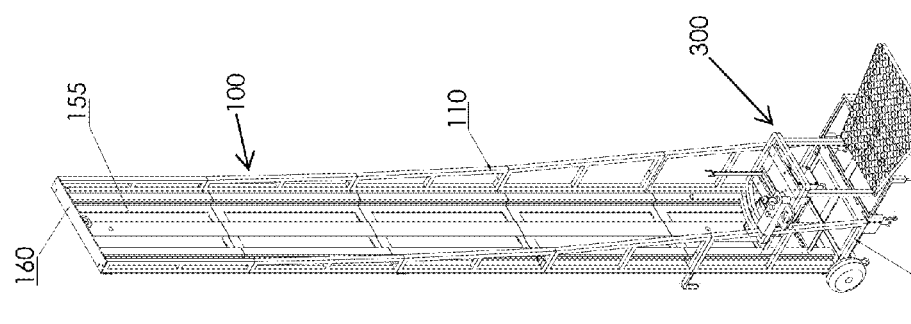
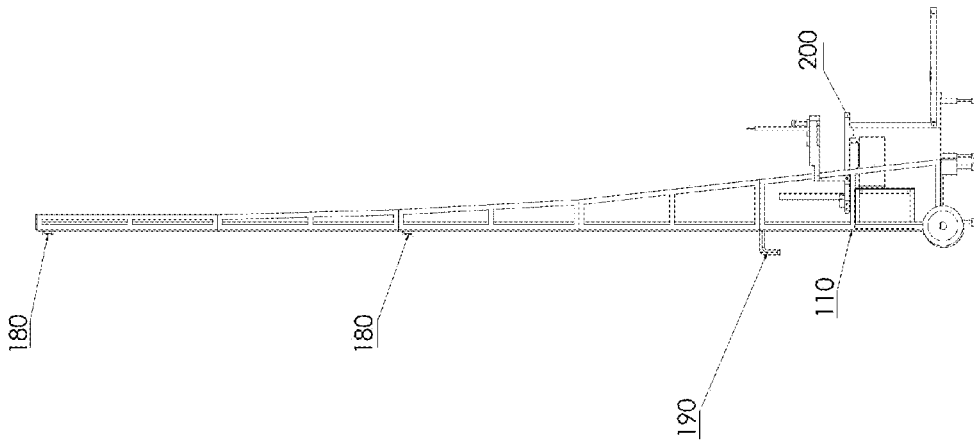

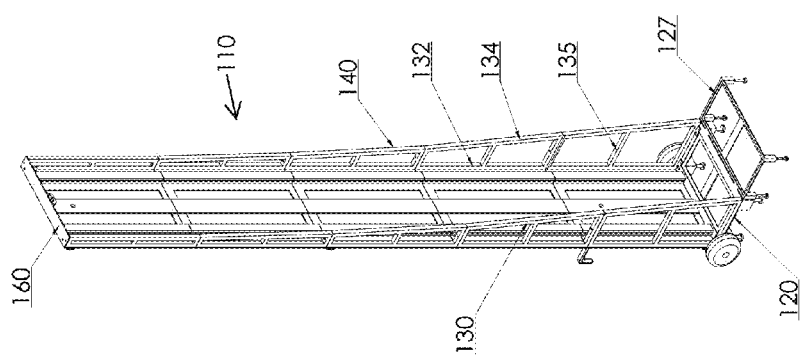
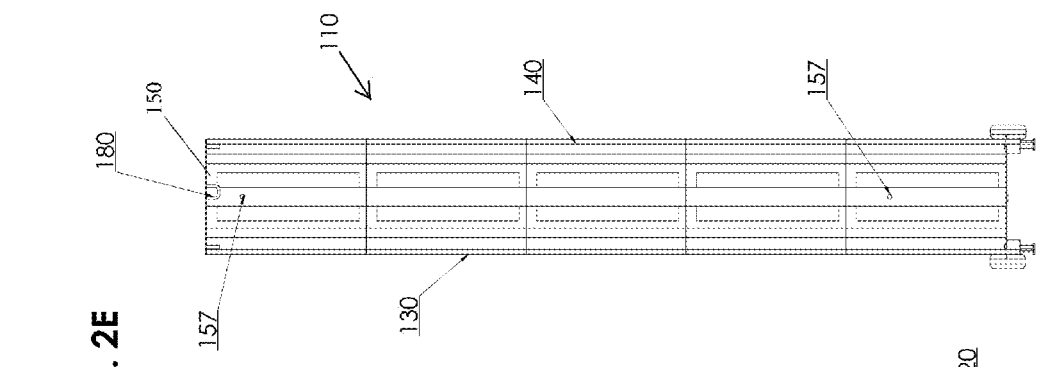
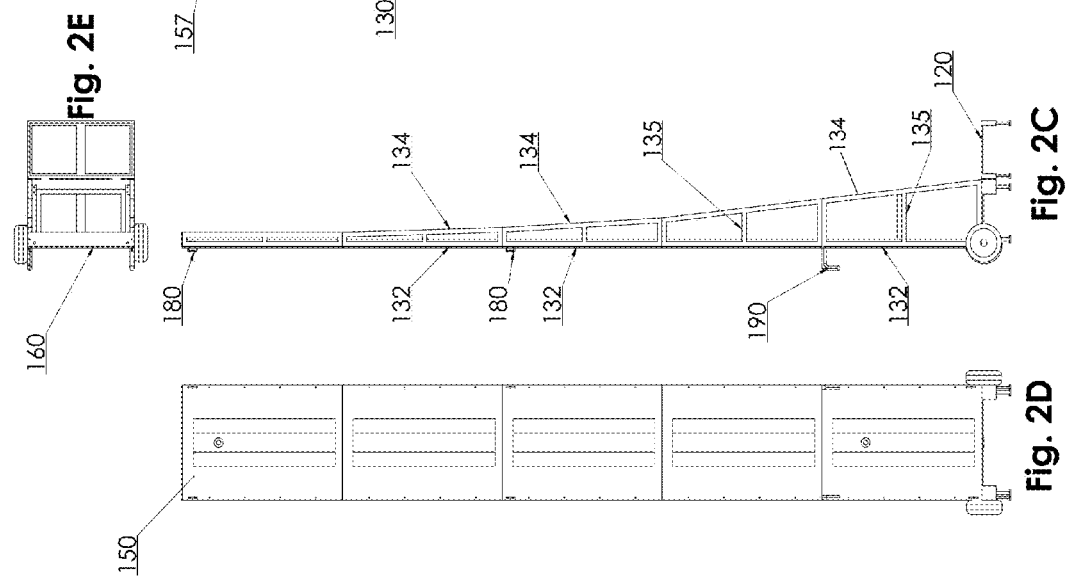
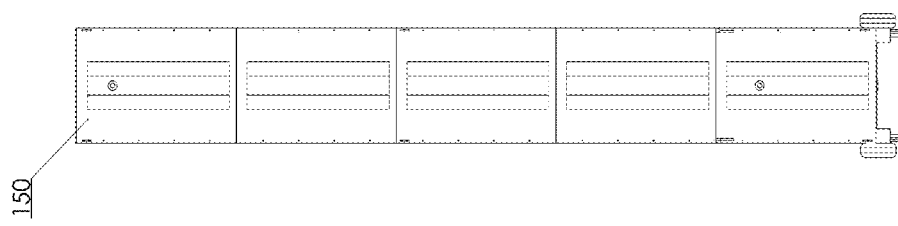

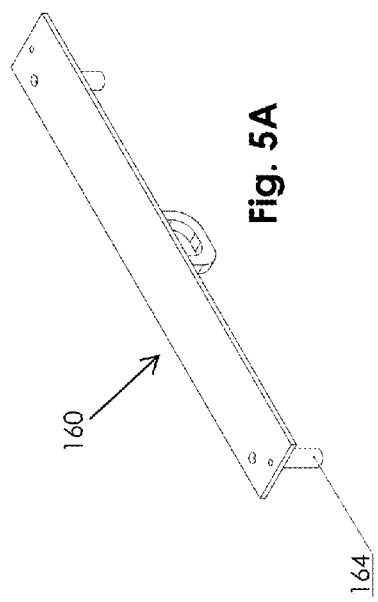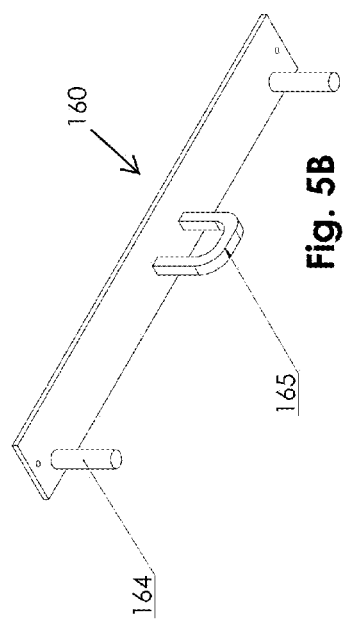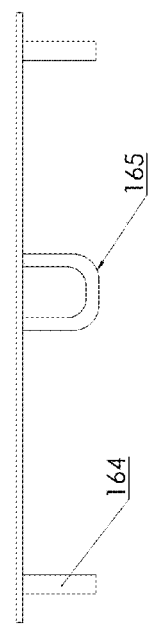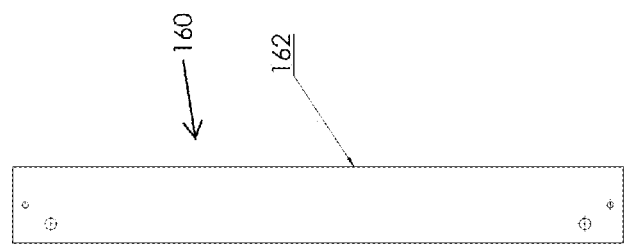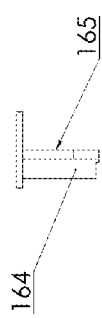

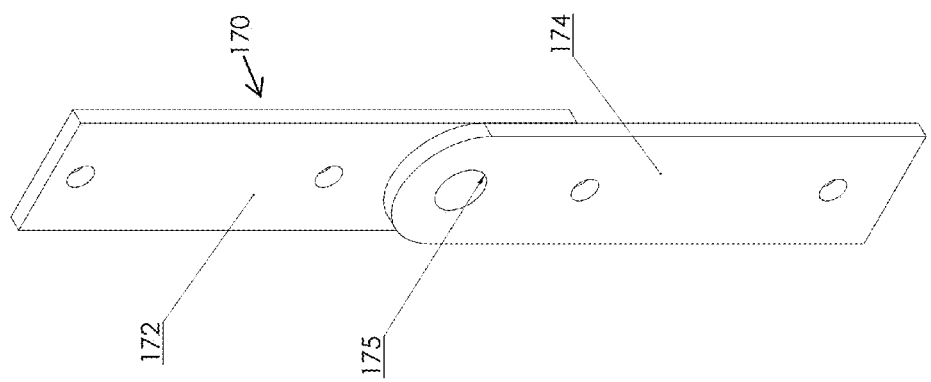
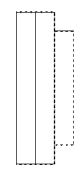
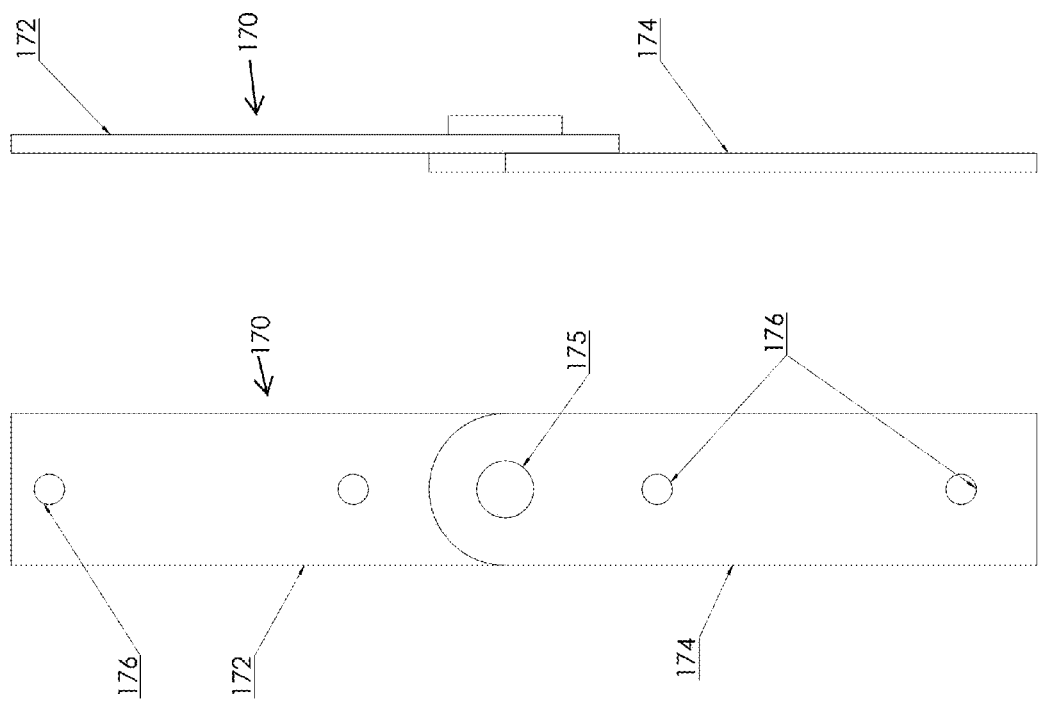
Fig. 6A, Fig. 6B, Fig. 6C, Fig. 6D

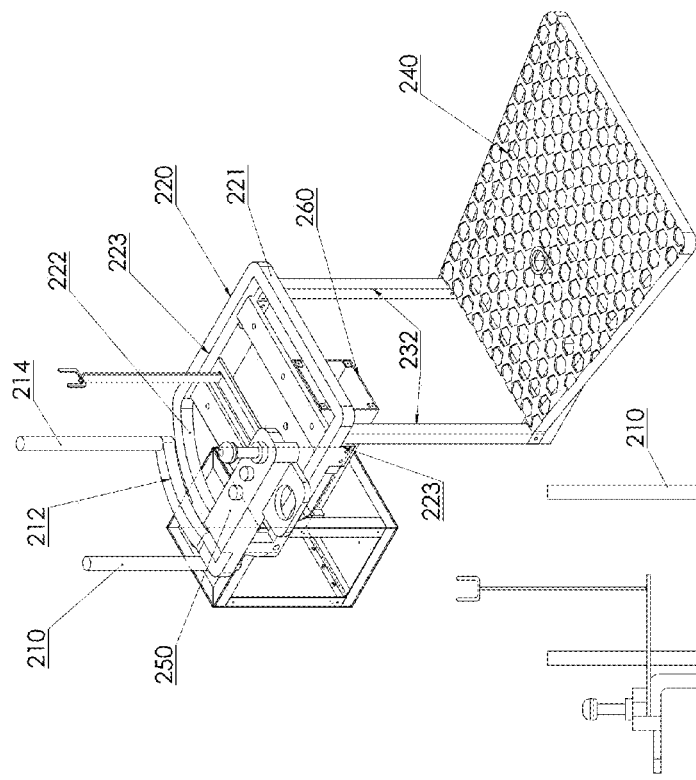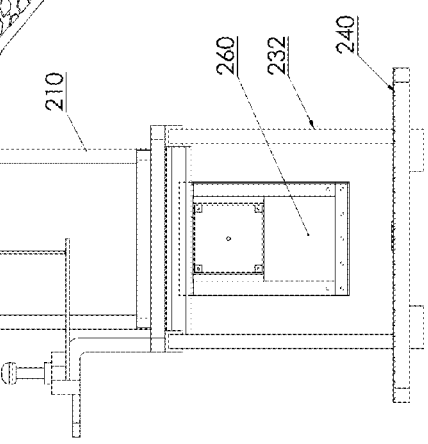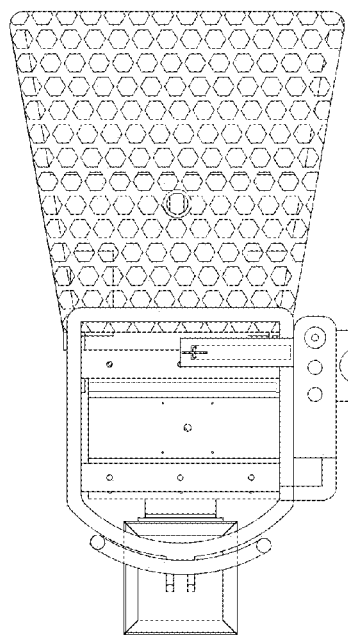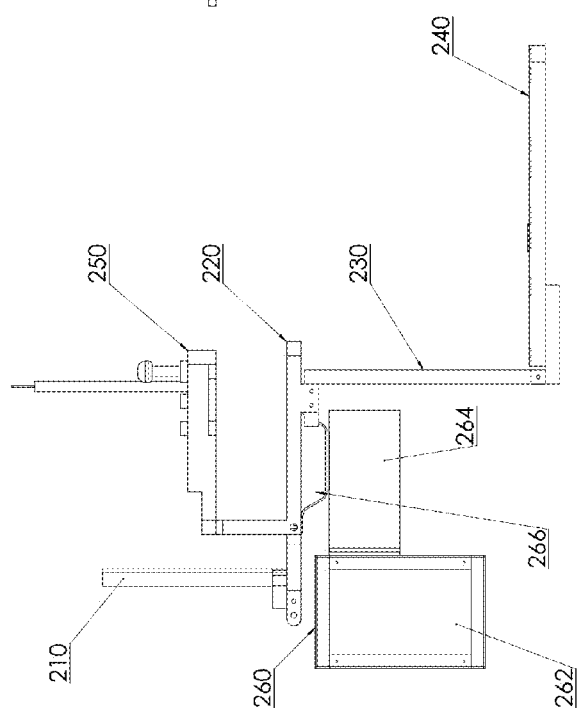

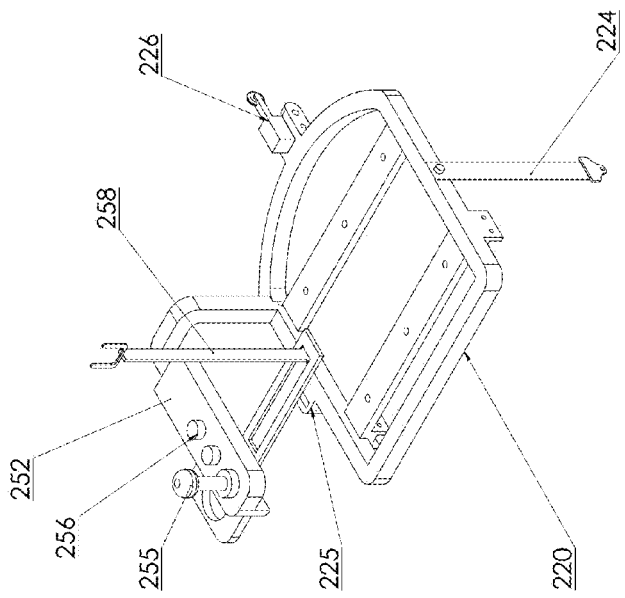
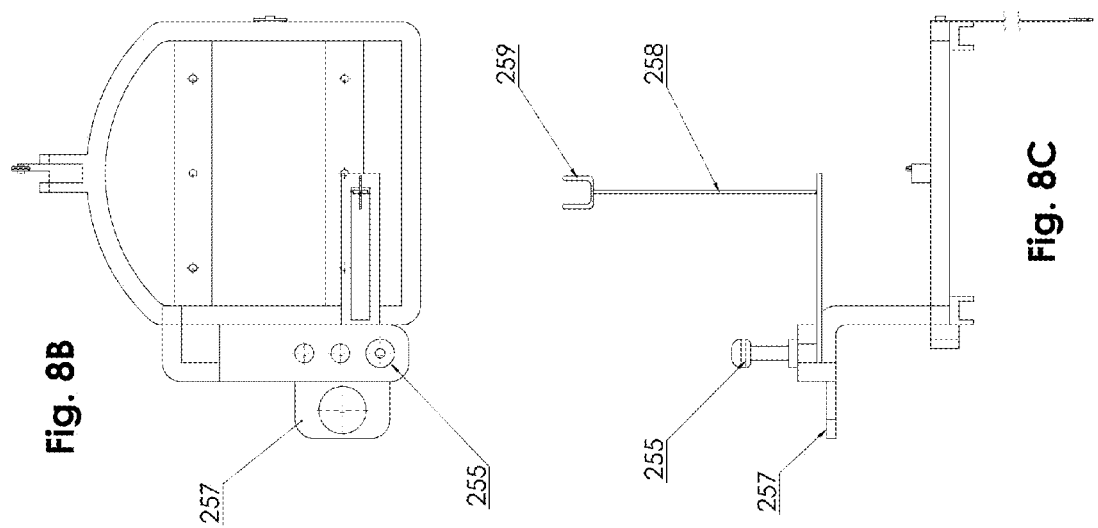

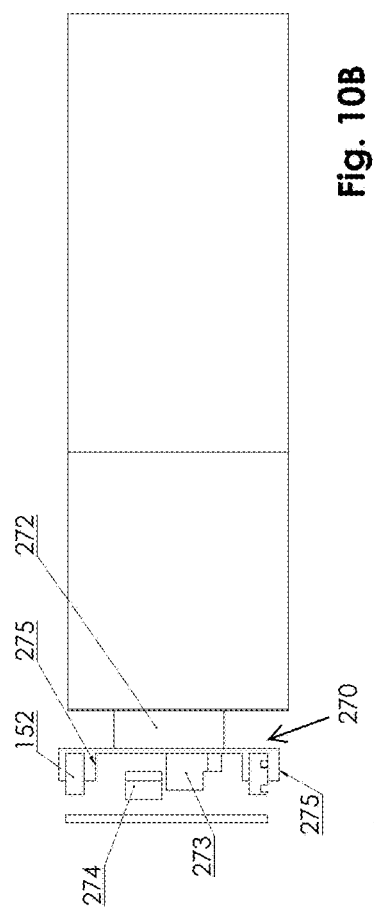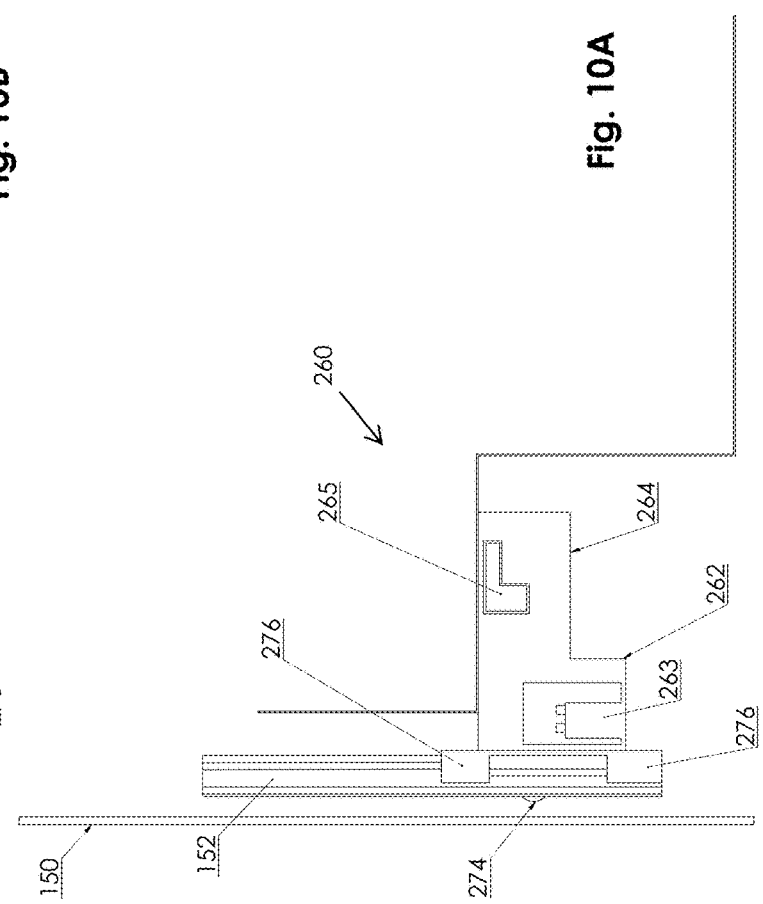

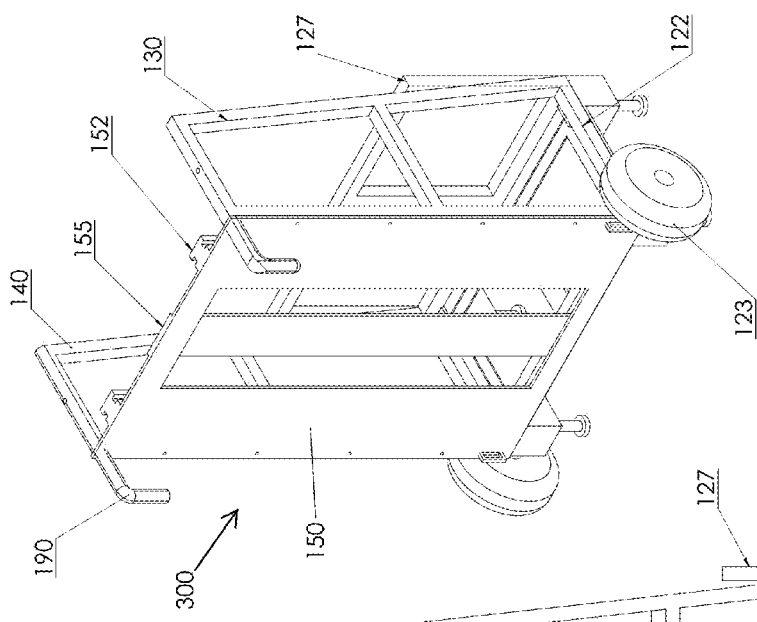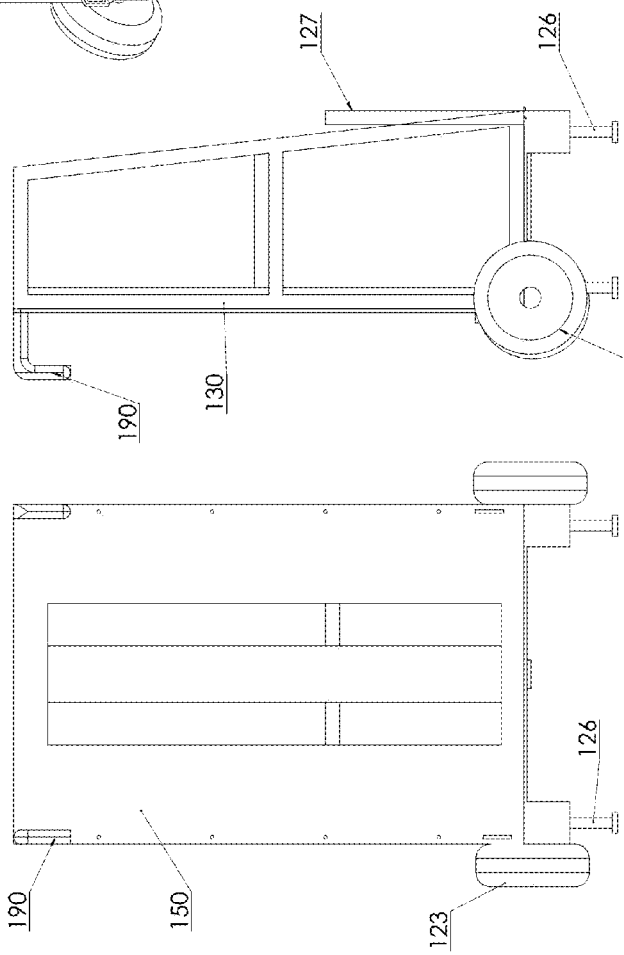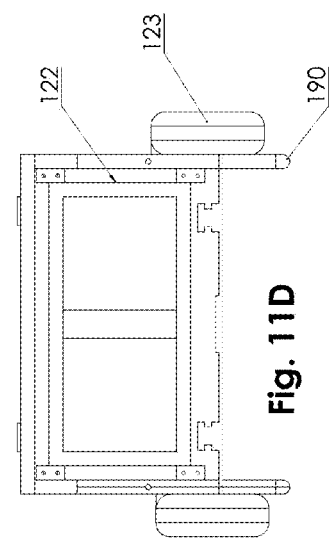

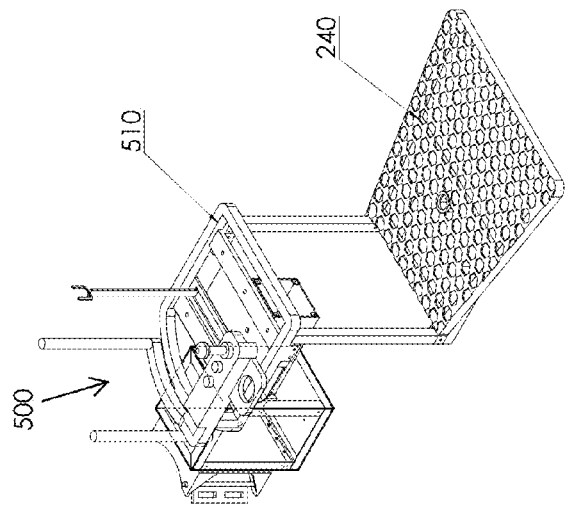
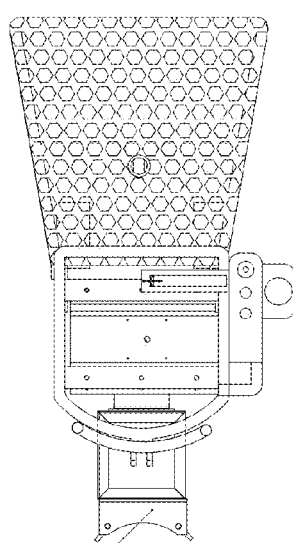
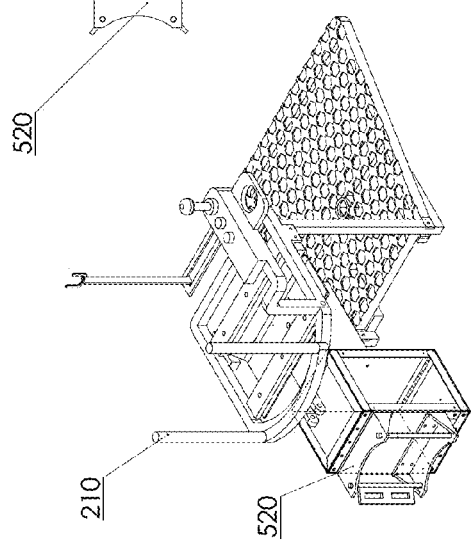
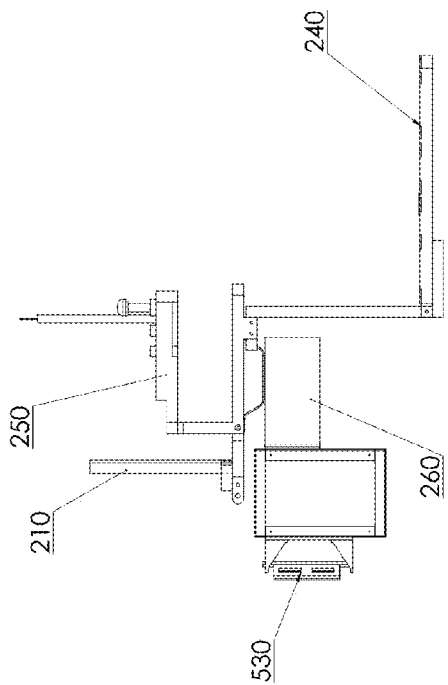
Fig. 13A
Fig. 13B
Fig. 13C
Fig. 13D

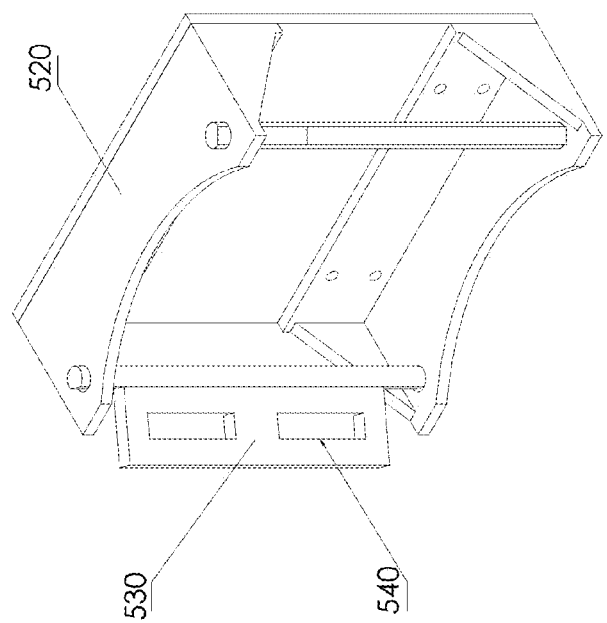
Fig. 14A
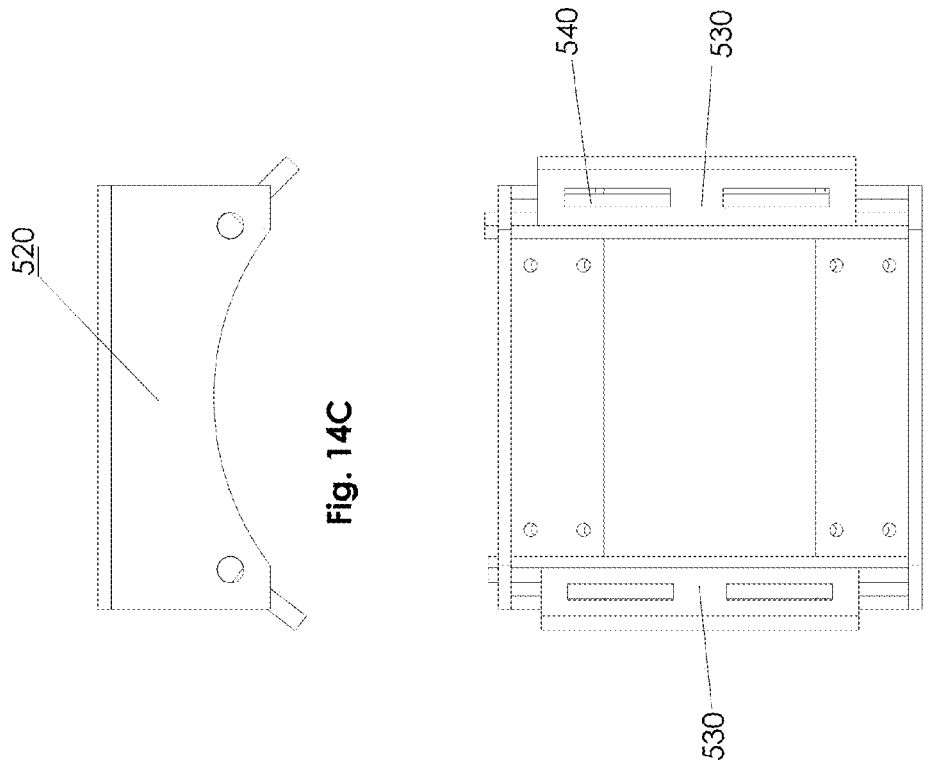
Fig. 14C
Fig. 14B

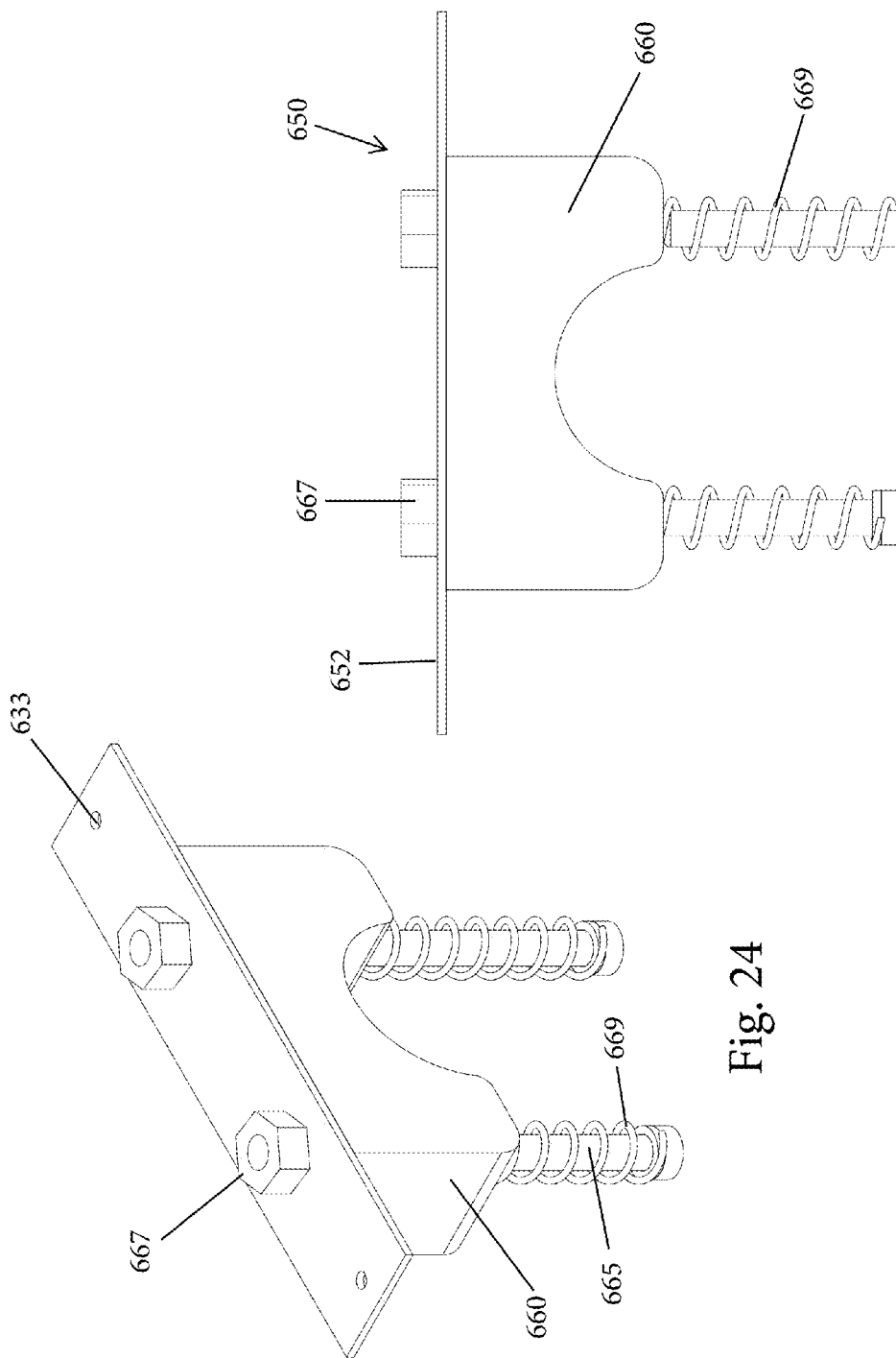

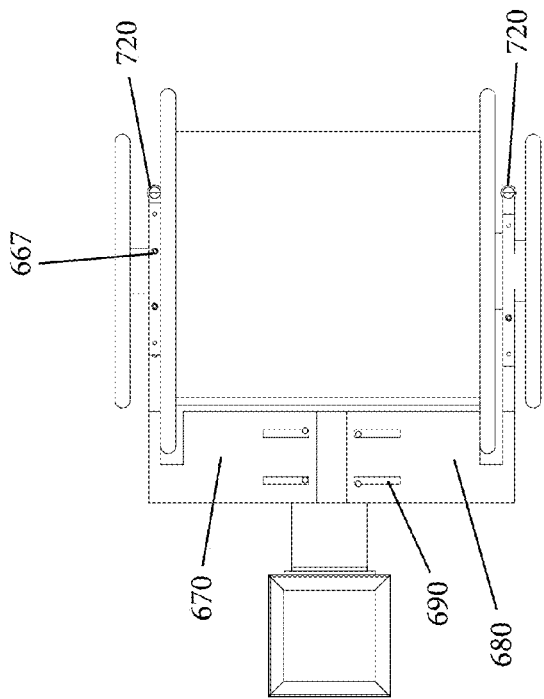
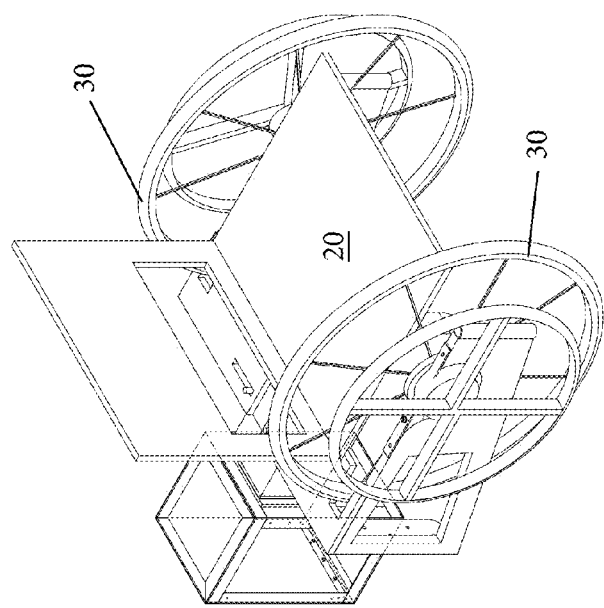

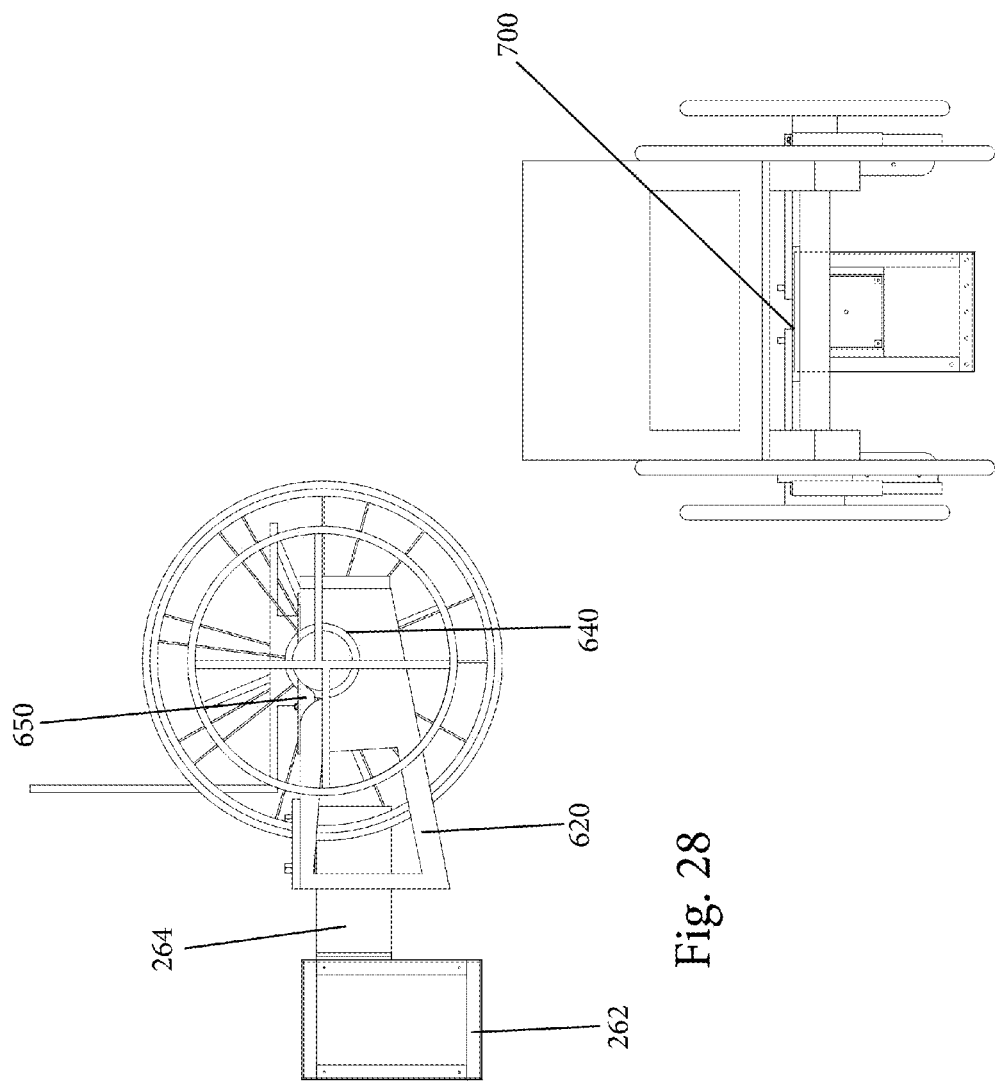

ELECTRICALLY CONTROLLED MOVABLE TREE STAND FOR SUPPORTING A PERSON

CROSS REFERENCE TO RELATED APPLICATION

The present invention is a continuation-in-part of U.S. patent application Ser. No. 15/244,215, filed Aug. 23, 2016, now U.S. Pat. No. 9,717,232, issued Aug. 1, 2017, which is hereby incorporated by reference in its entirety.

TECHNICAL FIELD

The present invention relates to a stand for supporting a person and more particularly, relates to a stand that is configured to mount to a tree and move (e.g., up/down and left/right movements) so as to be particularly useful as a tree stand for a hunter.

BACKGROUND

All conventional tree stands in today's market are fixed and limited to certain people with good physical ability to climb up the stand. They require climbing if they are the ladder built in type, or require climbing on a ladder to be installed if they are just tree stands. This becomes limited to a specific group of people with good physical ability to climb up or down the ladder.

Have you ever sat in your stand, waiting all day for your harvest to come by and when it shows up, it approaches you from the wrong direction and you miss your opportunity? Meaning, you are right sighted, right handed and the wild game appears to your right side and about to disappear on you. You try to position yourself and taking risk of falling, getting badly hurt or injure the wild game in which will die in suffering.

Conventional tree stands are fixed in position and require climbing up and down to access the stand and they do not rotate or swing to permit desired movement of the hunter relative to the wild game.

In case of an accidental fall, conventional tree stand do not offer a safe way of climbing down. Suspension while strapped to your safety harness can cut the blood circulation and you should not be suspended more than 15 minutes. In this situation, you are at the mercy of being found by someone to save you. There is therefore a need for an improved tree stand.

SUMMARY

The stand of the present invention solves the above-discussed deficiencies associated with conventional tree stands and can be configured to:
1—enable all hunters, even with some physical disability to safely climb up and enjoy the use a tree stand;
2—offer the hunter the freedom to rotate from about 0-300 degrees instead of a fixed position;
3—offer the hunter a safe way to get down in case of a fall by using the side support as a ladder so he/she doesn't get stranded in the middle of the forest waiting for someone to rescue them; and
4—Include controllers, such as joystick or a digital touch screen controller, where you can operate the system with just a push of a button.

Have you ever gone hunting and sat in your fixed tree stand almost all day waiting for a wild game to show up? All the sudden one shows up but from an opposite direction from your dominate sight or dominate hand. Your heart is beating so fast from excitement; you try to position yourself to have your target in sight, it's not working but you are not going to let go. You tried very hard and perhaps even compromised your own safety not to lose this wild game. You know what may have happened. You either lose track of your position or may end up getting severely hurt, paralyzed or even death, because you didn't take in consideration the recoil of your firearm. Or you may injure the wild game which will end up with painful death. Neither outcome is a good.

Since all tree stands have a fixed position, meaning, once you set it up, it's only one direction you are facing. In many cases, the wild game shows up from an opposite direction and you miss it.

What if the hunter is an injured veteran or someone with physical limitation to where that he or she can't climb a ladder? The motorized system of the present invention enables a user to be lifted up and down safely with a push of a button and enjoy hunting like everyone else.

The present invention is designed to allow the hunter to use a tree stand and give them the ability to swing and rotate to select the desired position/direction facing the target without missing the opportunity, injuring the wild animal or compromising their own safety. It also provides a safe way to get down or up in case of a slip or fall, instead of being suspended in mid-air by a harness that. The suspension in mid-air with the harness strapped, adding the weight of the person, creates high pressure that may cut the blood flow or supply to major parts of the body while waiting for someone to rescue them in the middle of the forest.

In one embodiment, a motorized tree stand includes a frame assembly for attachment to a tree. The frame assembly includes a rear wall that includes a vertical drive track and at least one vertical gliding rail spaced laterally therefrom. A seat assembly is operatively coupled to the rear wall of the frame assembly and provides a seat on which a user can sit. A first drive assembly is coupled to the seat assembly and includes a first motor that is connected to a driven wheel that seats against the vertical drive track to controllably move the seat assembly in a vertical direction along the frame assembly. A second drive assembly is coupled to a swivel plate for controllably moving the swivel plate resulting in swiveling of the seat assembly relative to the frame assembly. A controller and a power source are also provided.

In another embodiment, a motorized tree stand is provided and includes a frame assembly for attachment to a tree. The frame assembly includes a first vertical support and a second vertical support wall spaced proximate the first vertical support. The motorized tree stand includes an attachment plate coupled to the first vertical support and being configured to mount to a seat assembly that provides a seat on which a user can sit. The attachment plate is vertically driven along the first vertical support. A first drive assembly in the form of a rotatable threaded rod that is coupled to the second vertical support is operatively connected to a first motor for controlled rotation thereof. The first drive assembly includes a threaded block that is threadingly mated to the threaded rod such that rotation of the threaded rod causes movement of the threaded block in a first direction along the threaded rod and rotation of the threaded rod in a second direction causes movement of the threaded block in an opposite second direction along the threaded rod. The threaded block is connected to the attachment plate such that movement of the threaded block is translated into movement of the attachment plate. A controller is operatively connected to the first drive assembly; and a power source is connected to the first drive assembly and the controller.

BRIEF DESCRIPTION OF THE DRAWING FIGURES

Figure 3D:
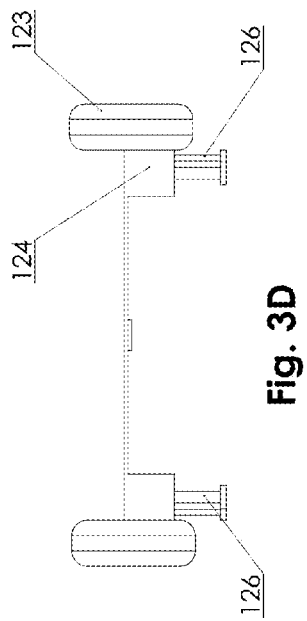
Figure 3C:
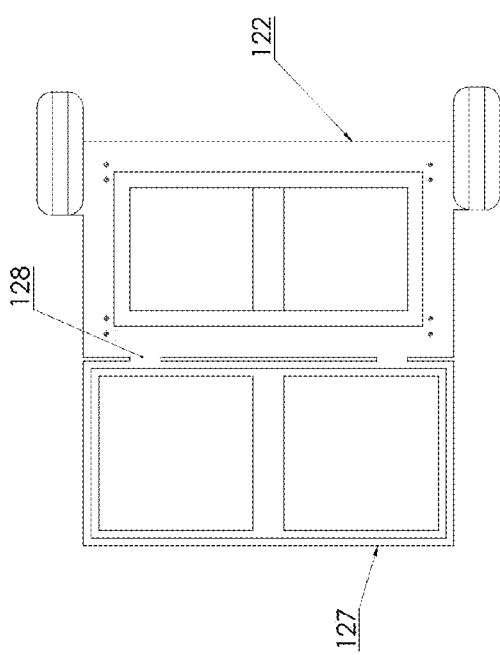
Figure 3B:
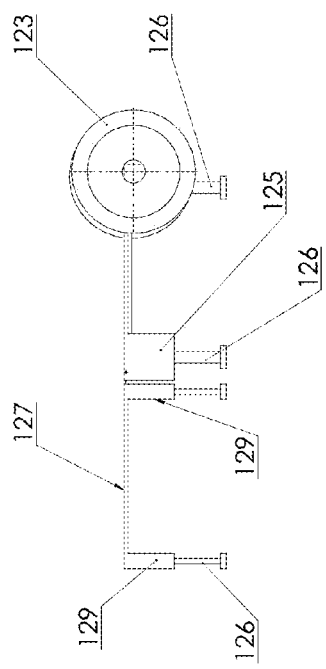
Figure 4A:
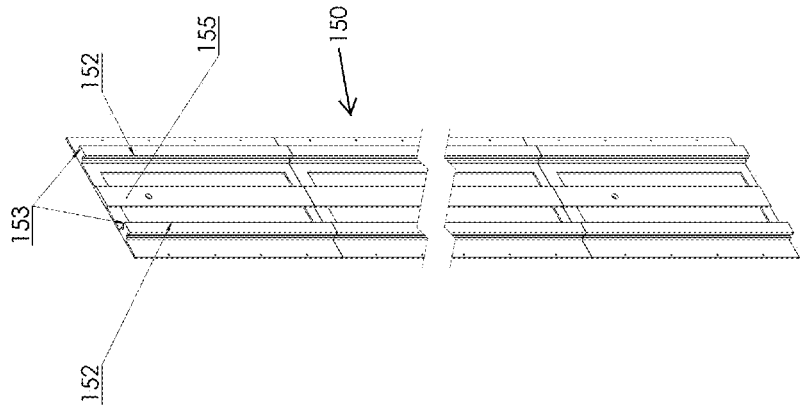
Figure 4B:
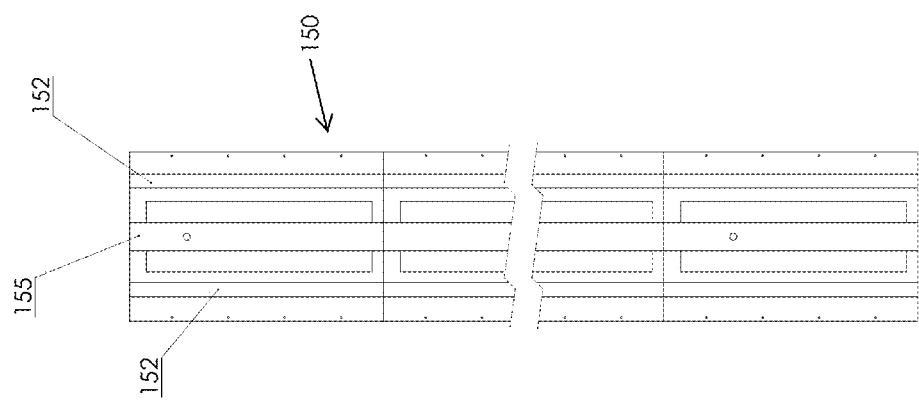
Figure 4D:
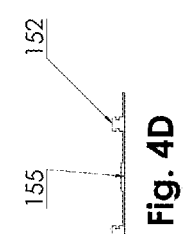
Figure 4C:
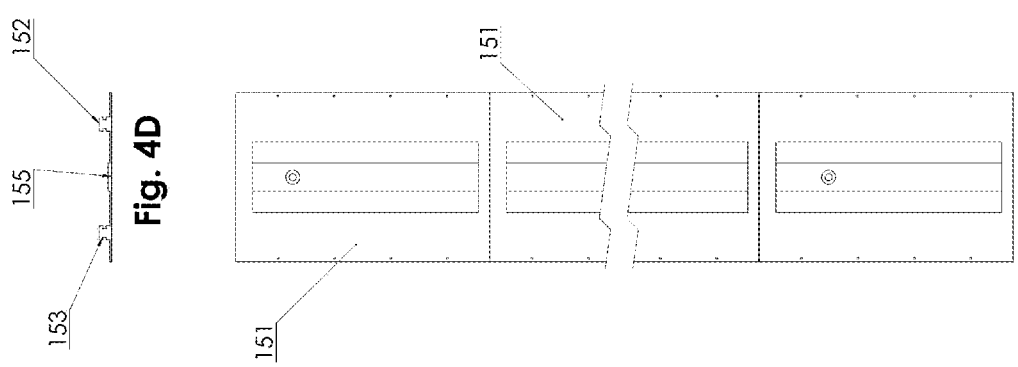
Figure 9A:
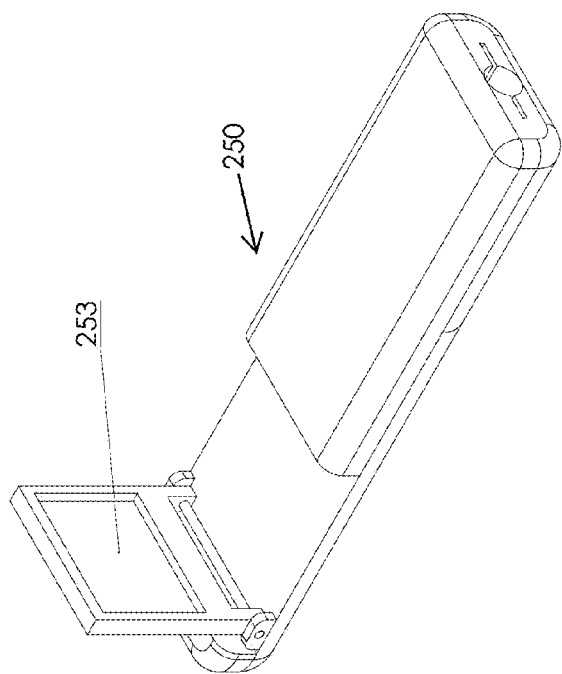
Figure 9D:
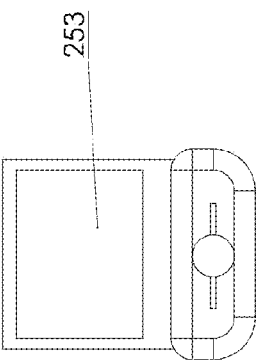
Figure 9C:
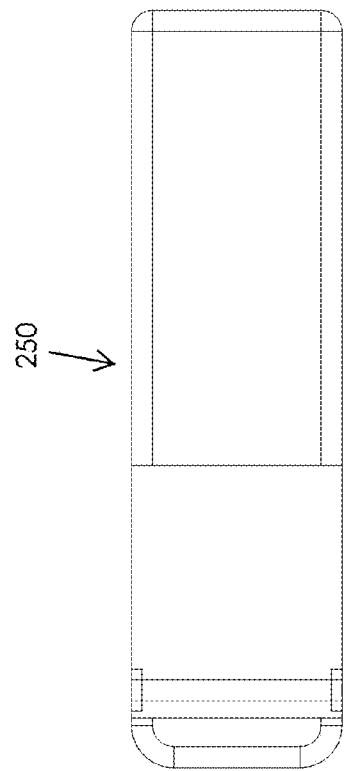
Figure 9B:
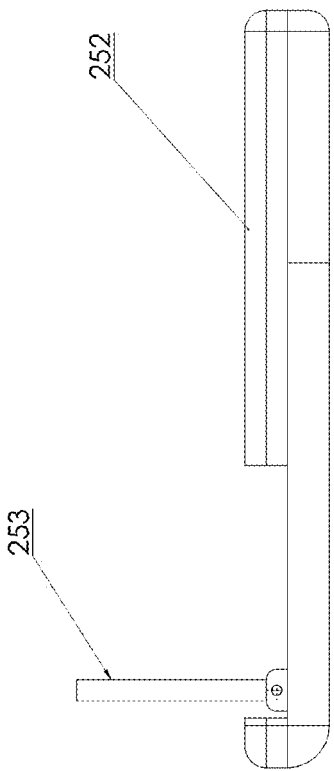
Figure 12A:
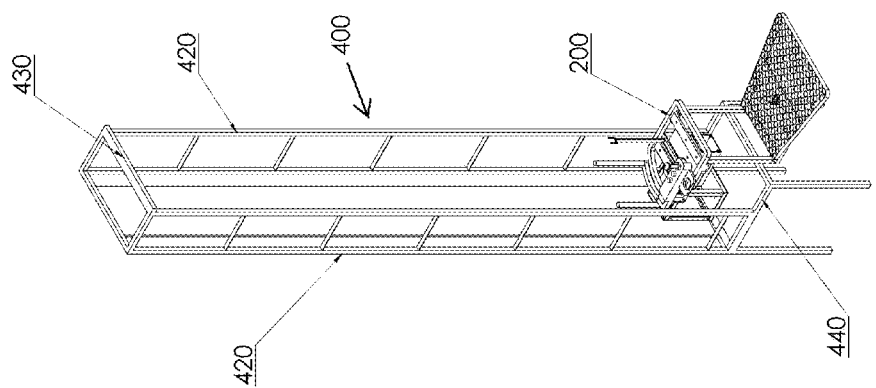
Figure 12B:
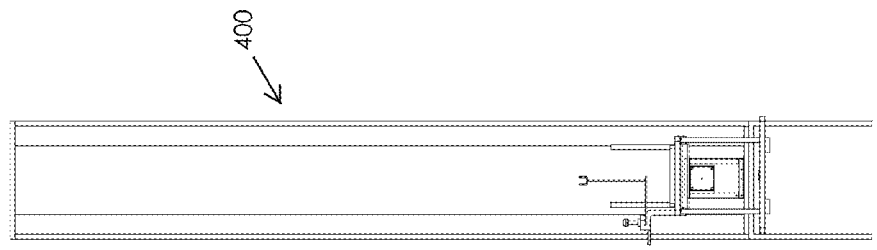
Figure 12C:
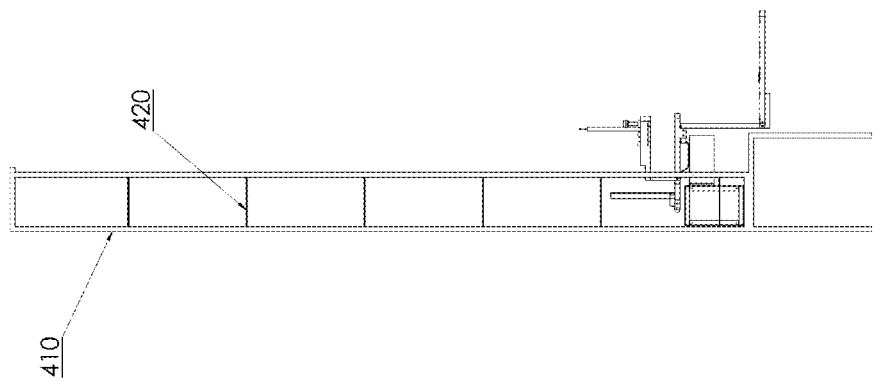
Figure 12D:
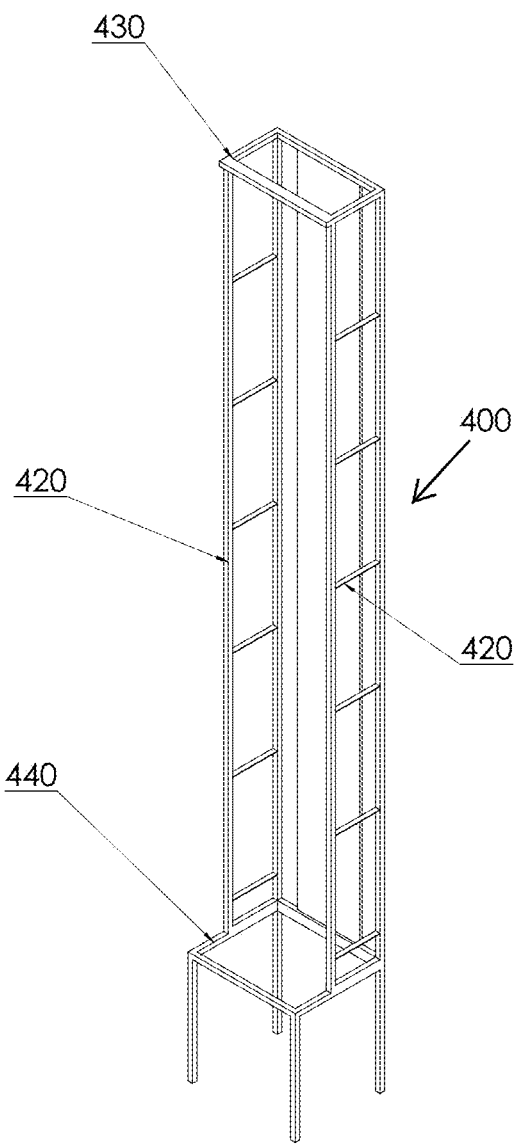
Figure 15:
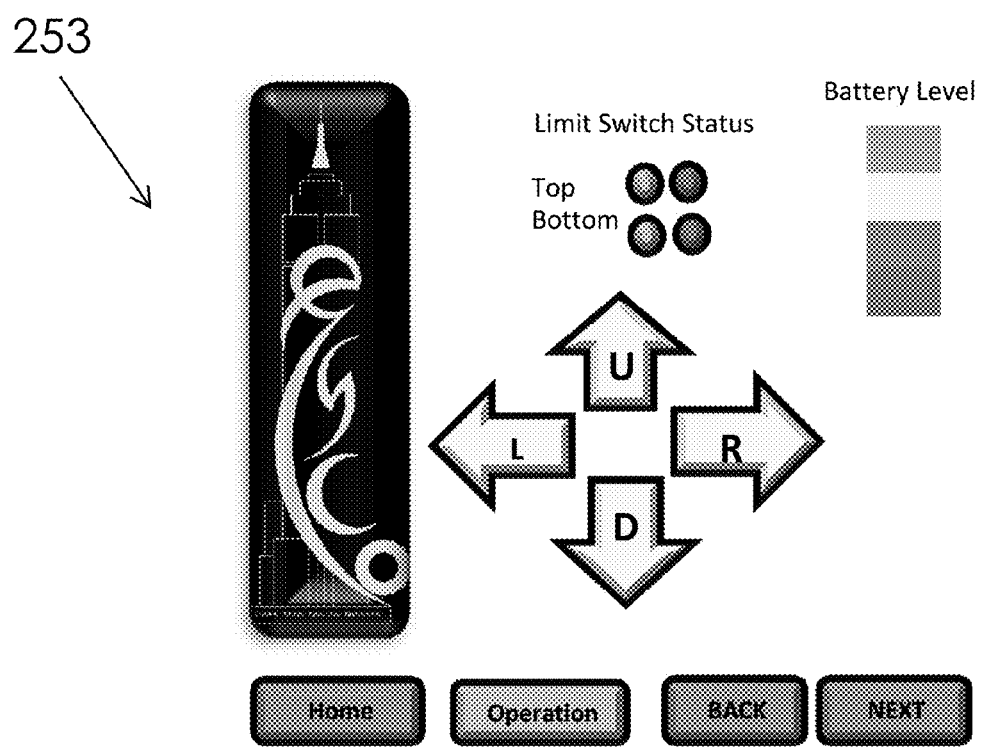
Figure 18:
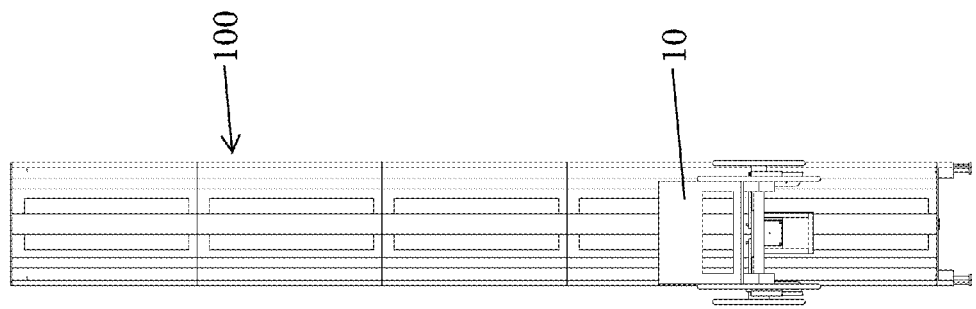
Figure 17:
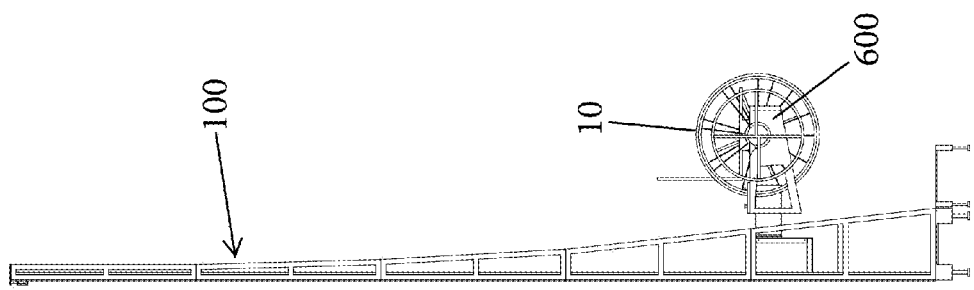
Figure 16:
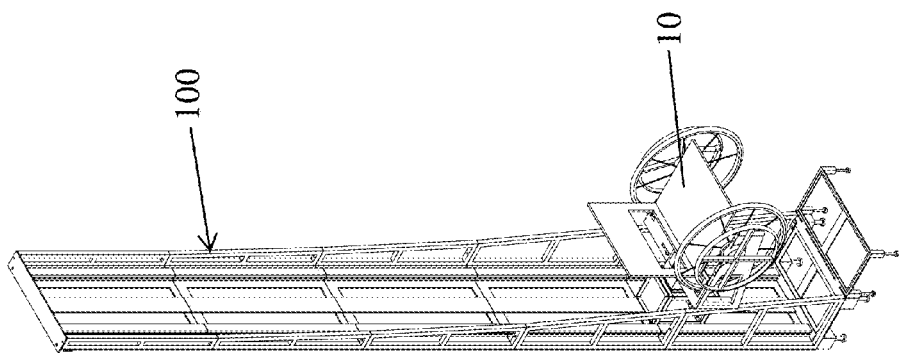
Figure 20:
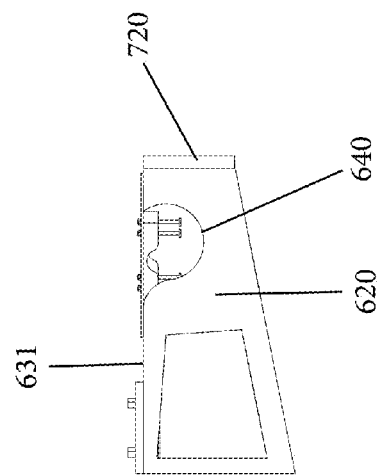
Figure 19:
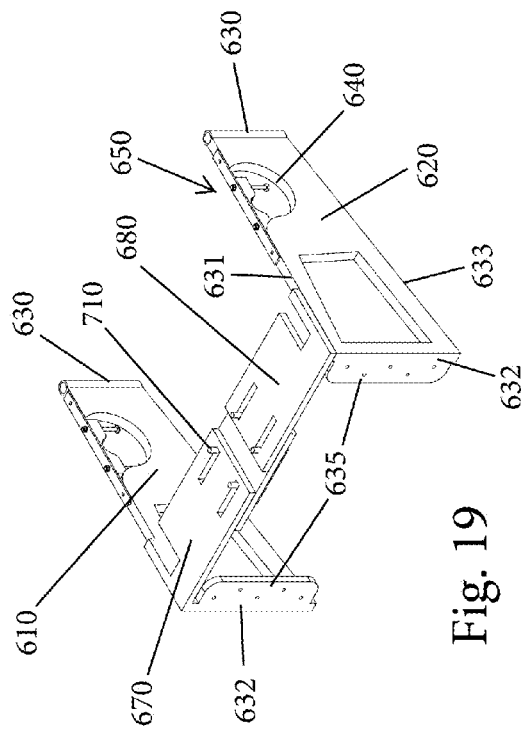
Figure 21:
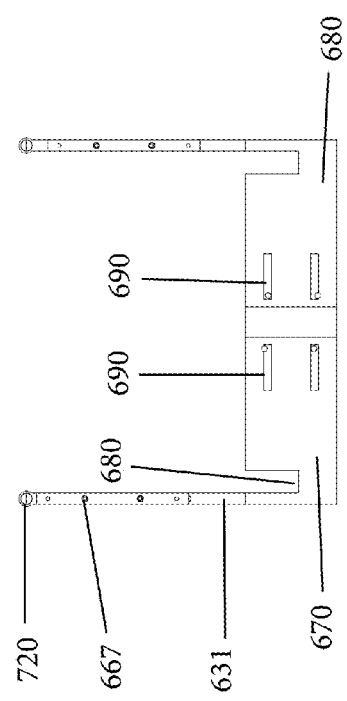
Figure 22:
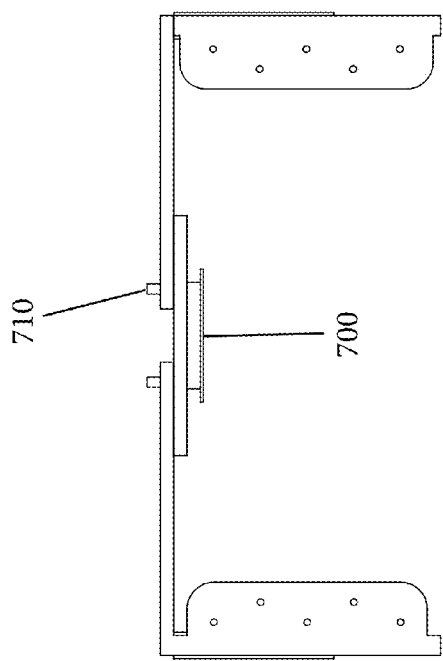
Figure 23:
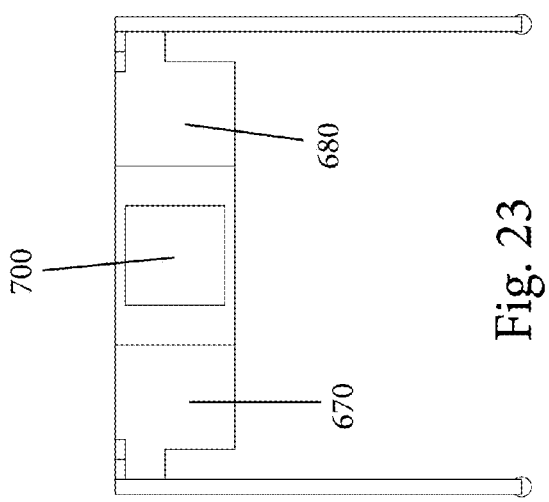
Figure 31:
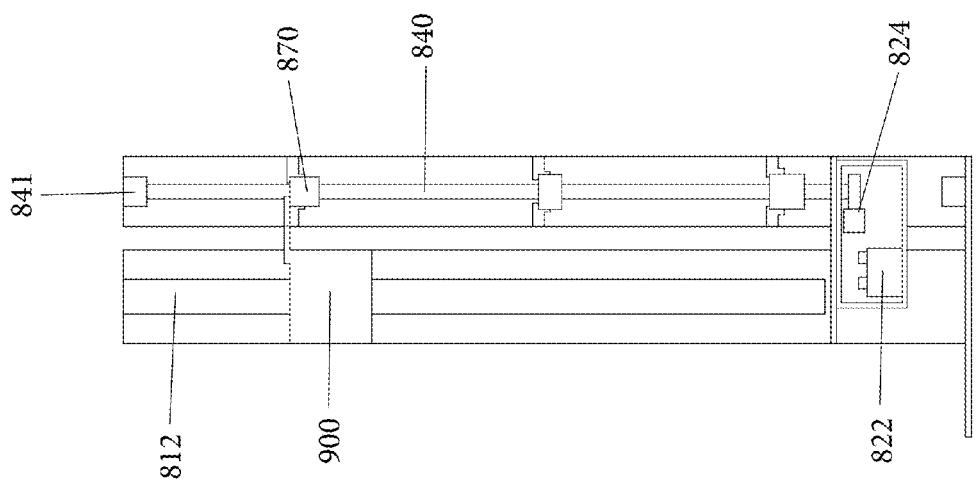
Figure 30:
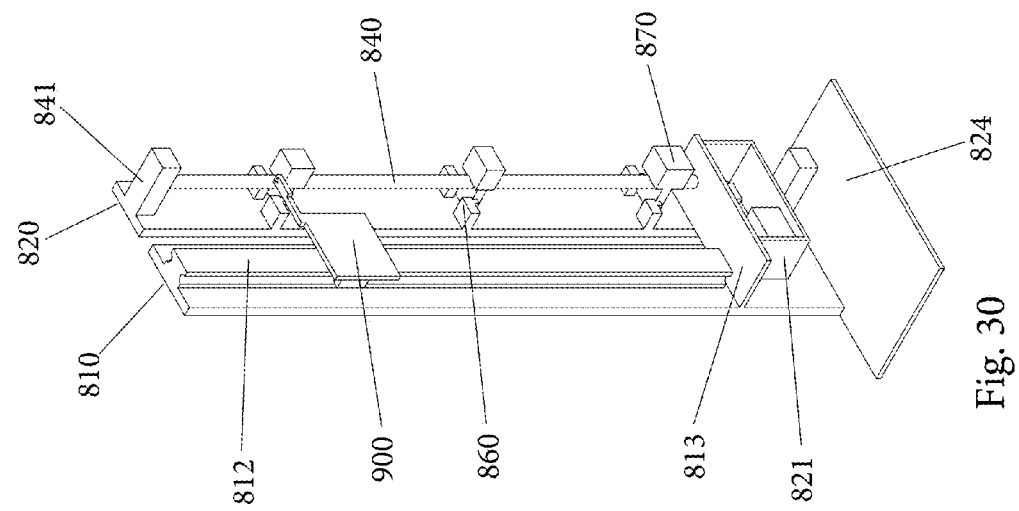
Figure 33:
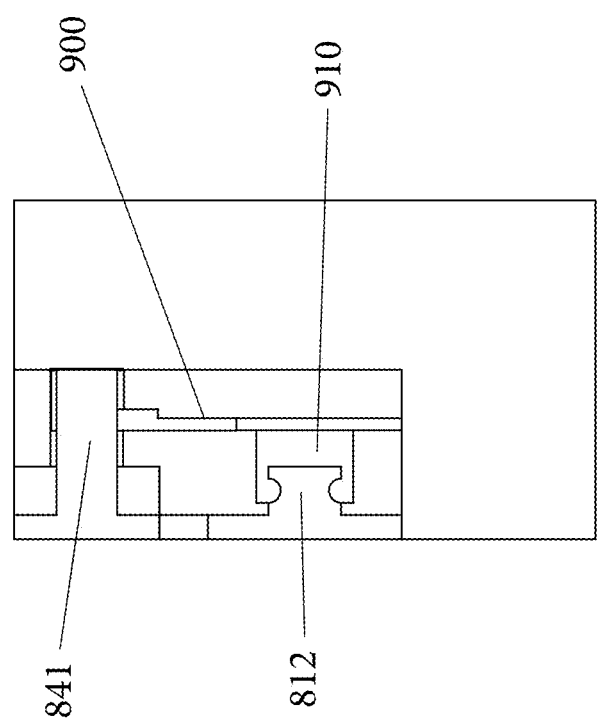
Figure 32:
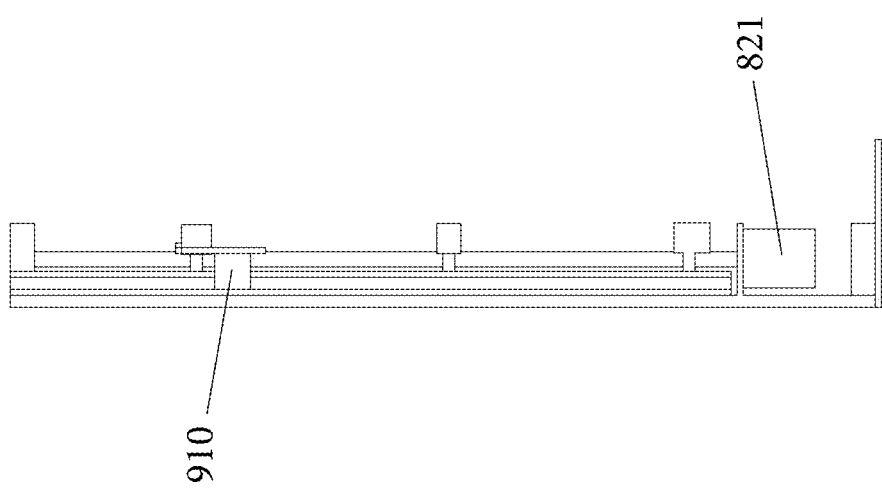
Figure 34:
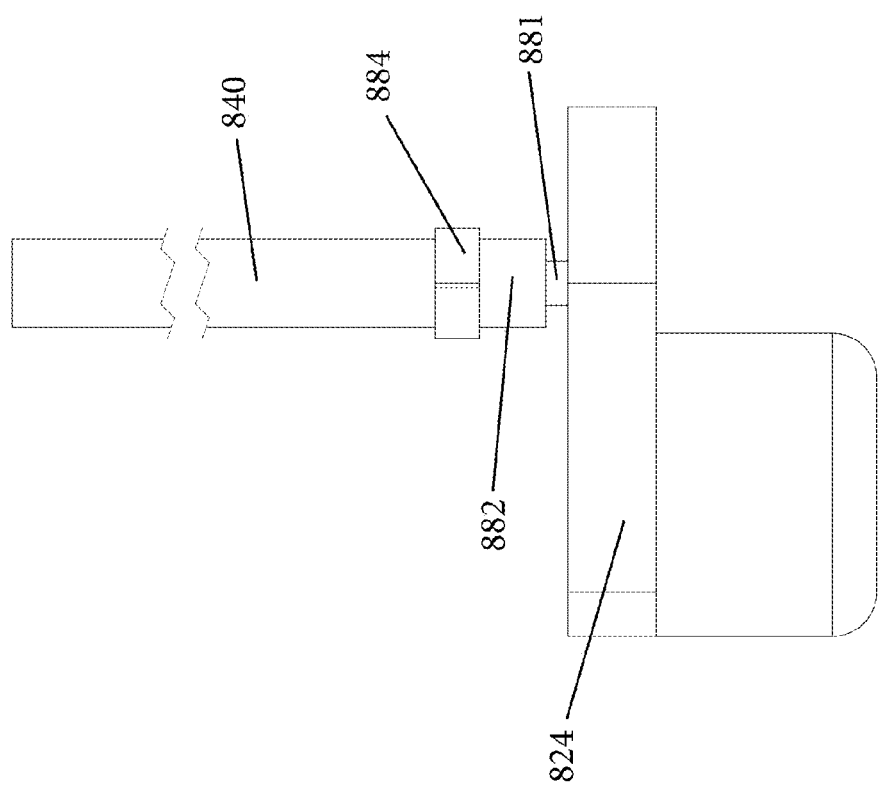
Figure 35:
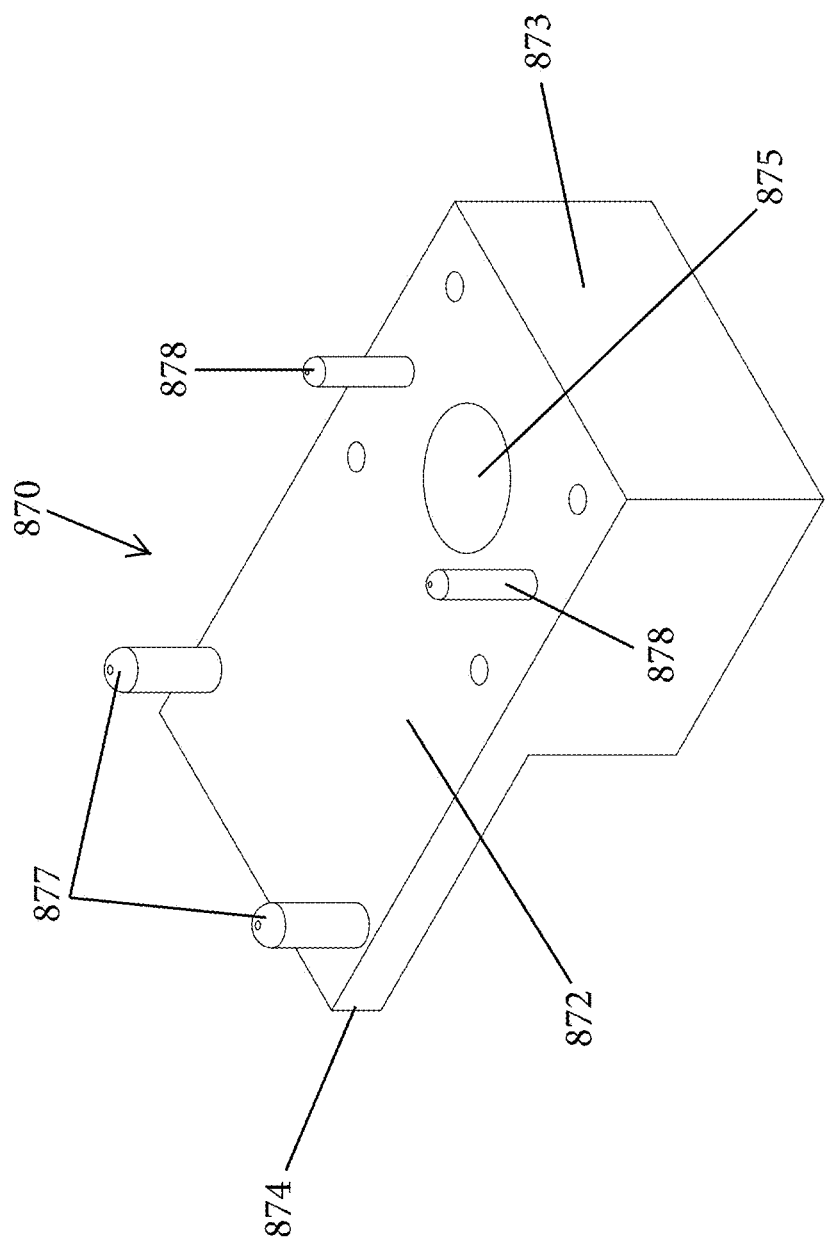
Figure 36:
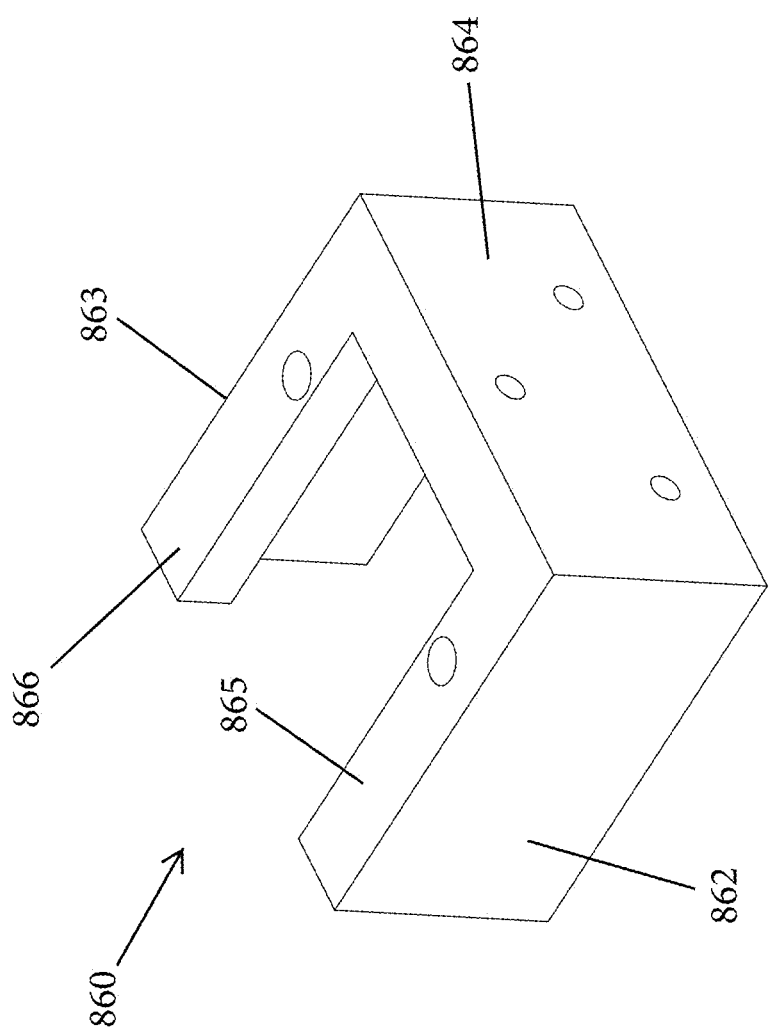
Figure 38:
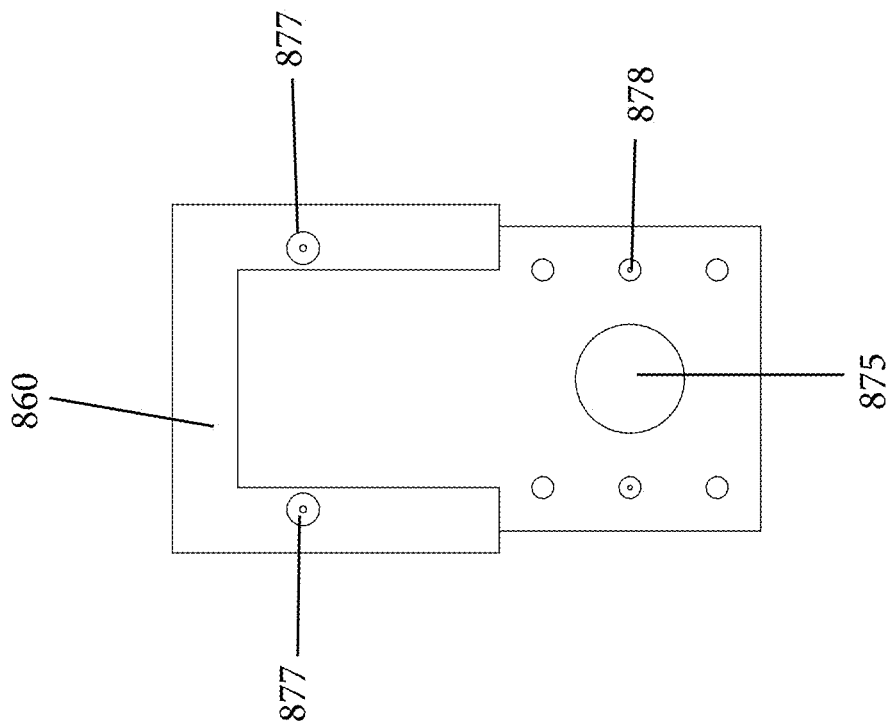
Figure 37:
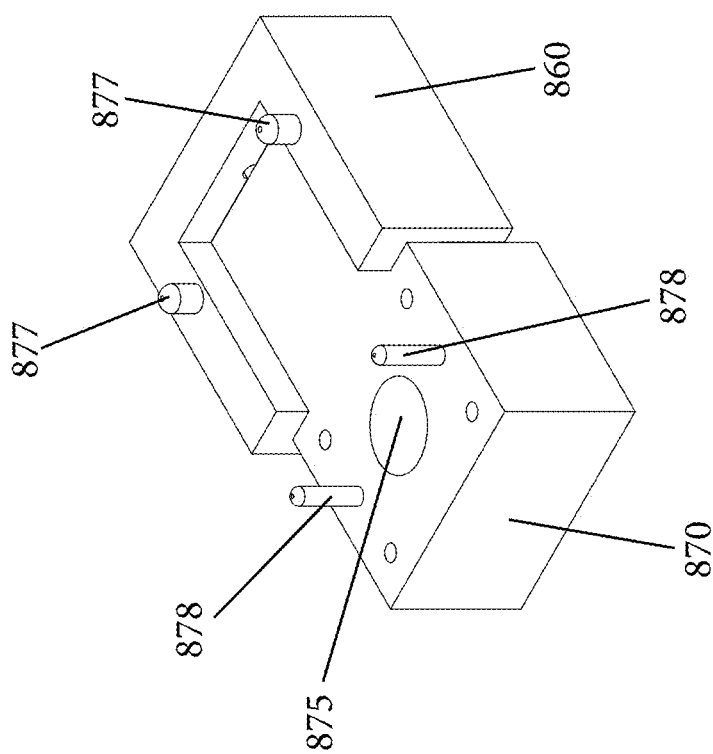
Figure 40:
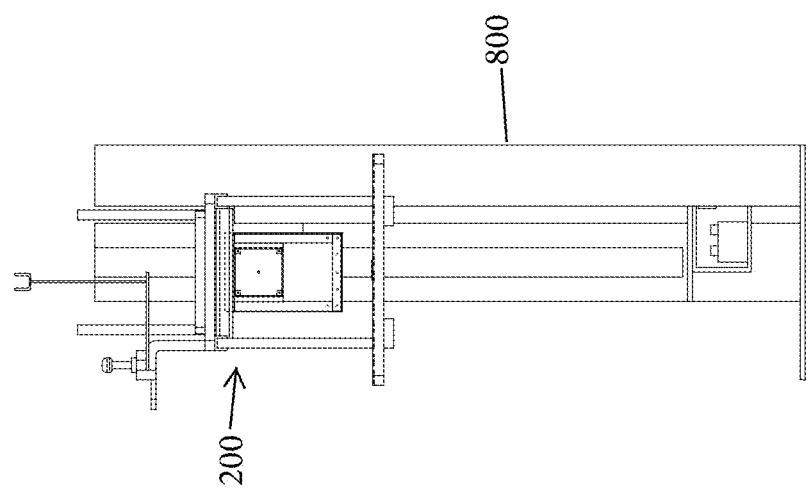
Figure 39:
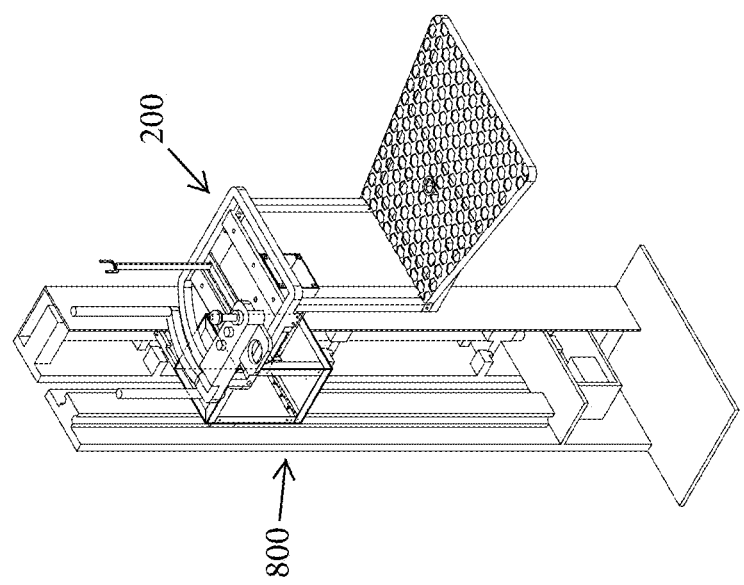

FIG. 1A is a perspective view of the electrically controlled movable tree stand in accordance with a first embodiment of the present invention;
FIG. 1B is a side elevation view thereof;
FIG. 2A is a perspective view of a frame assembly of the tree stand of FIG. 1;
FIG. 2B is a front elevation view thereof;
FIG. 2C is a side elevation view thereof;
FIG. 2D is a rear elevation view thereof;
FIG. 2E is a top plan view thereof;
FIG. 3A is a perspective view of a base platform of the tree stand of FIG. 1;
FIG. 3B is a side elevation view thereof;
FIG. 3C is a top plan view thereof;
FIG. 3D is an end elevation view thereof;
FIG. 4A is a front perspective view of a back wall of the tree stand of FIG. 1;
FIG. 4B is a front elevation view thereof;
FIG. 4C is a rear elevation view thereof;
FIG. 4D is a top plan view thereof;
FIG. 5A is a top perspective view of a top plate of the tree stand of FIG. 1;
FIG. 5B is a bottom perspective view thereof;
FIG. 5C is a side elevation thereof;
FIG. 5D is a top plan view thereof;
FIG. 5E is a front elevation view thereof;
FIG. 6A is a perspective view of foldable hinges of the tree stand of FIG. 1;
FIG. 6B is a front elevation view thereof;
FIG. 6C is a side elevation view thereof;
FIG. 6D is a top plan view thereof;
FIG. 7A is a perspective view of a seat assembly of the tree stand of FIG. 1;
FIG. 7B is a side elevation view thereof;
FIG. 7C is a front elevation view thereof;
FIG. 7D is a top plan view thereof;
FIG. 8A is a perspective view of an analog control arm of the tree stand of FIG. 1;
FIG. 8B is a top plan view thereof;
FIG. 8C is a side elevation view thereof;
FIG. 9A is a perspective view of an arm rest controller of the tree stand of FIG. 1;
FIG. 9B is a side elevation view thereof;
FIG. 9C is a top plan view thereof;
FIG. 9D is a front elevation view thereof;
FIG. 10A is a side elevation view of a seat foundation of the tree stand of FIG. 1;
FIG. 10B is a top plan view thereof;
FIG. 11A is a perspective view of a folded cart of the tree stand of FIG. 1;
FIG. 11B is a side elevation view thereof;
FIG. 11C is a rear elevation view thereof;
FIG. 11D is a top plan view;
FIG. 12A is a front perspective view of a tree stand incorporating an alternative cage structure;
FIG. 12B is a front elevation view thereof;
FIG. 12C is a side elevation view thereof;
FIG. 12D is a perspective view thereof without the seat assembly;
FIG. 13A is a front perspective view of an alternative rotating/swinging tree stand;
FIG. 13B is a rear perspective view thereof;
FIG. 13C is a front elevation view thereof;
FIG. 13D is a top plan view thereof;
FIG. 14A is a perspective view of a seat strapping assembly of the tree stand of FIG. 13A;
FIG. 14B is a front elevation view thereof;
FIG. 14C is a top plan view thereof;
FIG. 15 is a graphic representative of a graphical user interface on a touch screen display;
FIG. 16 is a side and front perspective view of a wheelchair lift for assembly coupled to an automated tree stand;
FIG. 17 is a side elevation view thereof;
FIG. 18 is a front elevation view thereof;
FIG. 19 is a side and rear perspective view of an adjustable wheelchair fork assembly;
FIG. 20 is a side elevation thereof;
FIG. 21 is a top plan view thereof;
FIG. 22 is a rear elevation view thereof;
FIG. 23 is a bottom plan view thereof;
FIG. 24 is a perspective view of a brake member;
FIG. 25 is a side elevation view thereof;
FIG. 26 is a perspective view of a wheelchair coupled to the adjustable wheelchair fork assembly;
FIG. 27 is a top plan view thereof;
FIG. 28 is a side elevation view thereof;
FIG. 29 is a front elevation view thereof;
FIG. 30 is a perspective view of a ball screw drive mechanism that is part of the tree stand;
FIG. 31 is a front elevation view thereof;
FIG. 32 is a side elevation view thereof;
FIG. 33 is a top plan view thereof;
FIG. 34 is a side elevation view of a motor and coupling assembly for driving the ball screw drive shaft;
FIG. 35 is a top perspective view of a threaded block for use in the ball screw drive mechanism;
FIG. 36 is a top perspective view of a brake block;
FIG. 37 is a top perspective view of the threaded block coupled to the brake block;
FIG. 38 is a top plan view thereof;
FIG. 39 is a perspective of the ball screw drive mechanism coupled to a seat assembly; and
FIG. 40 is a front elevation view thereof.

DETAILED DESCRIPTION OF CERTAIN EMBODIMENTS

As stated above, the present system solves the hunter's fixed position and enables a hunter with some physical disability to climb up and down safely and enjoy the use of a tree stand.

FIGS. 1A and 1B illustrate an electrically controllable tree stand 100 that can be moved in one or more directions under the control of the user. As described herein, the tree stand 100 is formed of a number of components/assemblies that interconnect with one another to form the assembled tree stand 100. As shown, the tree stand 100 has a selected height and in particular, the height of the tree stand 100 is selected in view of the desired height that the person who is supported by the tree stand wishes to be elevated at relative to the ground surface on which the tree stand 100 lies.

FIGS. 2A-15 illustrate the various individual parts/assemblies that form the tree stand 100 and each are described below in detail.

Turning first to FIGS. 2A-6D which show components (parts) that form a frame assembly 110 of the tree stand 100.

FIGS. 2A-2E show the frame assembly 110 in its assembled form. As shown, the frame assembly 110 defines the height of the tree stand 100 and also is the part that rests against the ground surface and includes a leveling feature as described below. The frame assembly 110 includes a base platform 120, a first upright frame (right side) 130, a second upright frame (left side) 140, an upright back wall 150, a top cross member 160, a plurality of hinges 170, one or more strapping points 180 and a cart handle 190.

FIGS. 3A-3D illustrate one exemplary base platform 120. It will be appreciated that the base platform 120 can take any number of different shapes and sizes and the illustrated base platform 120 is generally square shaped. The base platform 120 is formed of a base station 122 that is formed of a number of structural supports, such as rear and forward transverse supports and a pair of side supports extending therebetween and a center support between the rear and forward transverse supports. Along the rear transverse support a pair of wheels 123 are rotatably mounted. For example and as shown, the rear transverse support can include downwardly extending legs 124 to which the wheels 123 are rotatably mounted. The wheel 123 includes an axial and a bearing can be provided within the leg 124. The forward transverse support can also include downwardly extending legs 125 from which leveling feet 126 adjustably extend. Each leg 125 includes one leveling foot 126 which moves in an axially direction and can be locked in any number of different vertical positions. For example, the leveling foot 126 can be a screw based foot that is rotated to change the length of the leveling foot 126 that extends below the leg 125. In addition, each leg 124 also includes one leveling foot 126.

The base platform 120 also includes a foldable extension 127 which is foldable relative to the base station 122. For example, the foldable extension 127 can be coupled to the base station 122 by a hinge 128 that allows the foldable extension 127 to fold. The foldable extension 127 can thus be positioned between a folded position (storage position) in which the foldable extension 127 is folded along hinge 128 and lies on top of the base station 122 and an extended (in-use) position in which the foldable extension 127 lies adjacent the base station 122 as shown in FIGS. 3A-3D. In the extended position, it will be appreciated that the foldable extension 127 increases the footprint of the base platform 120. Similar to the base station 122, the foldable extension 127 includes a number of structural supports, such as rear and forward transverse supports and a pair of side supports extending therebetween and a center support between the rear and forward transverse supports.

Each of the forward and rear transverse supports can include downwardly extending legs 129. Each leg 129 includes one leveling foot 126 which moves in an axially direction and can be locked in any number of different vertical positions.

FIGS. 2A-2C illustrate the first upright frame (right side) 130 and the second upright frame (left side) 140 which can be a mirror image one another and therefore, at least in one embodiment, have the same construction. Each of the first and second upright frames 130, 140 include first and second angled vertical supports (rails) 132, 134 that converge in a direction toward an upper end thereof. As shown, the first rail 132 can be a linear rail and the second rail 134 can be formed at an angle thereto. Between the first and second angled vertical supports 132, 134, a plurality of cross-supports 135 are provided and are coupled to their ends to the two supports 132, 134. One of the cross-supports 135 is a bottom cross support extends between and is coupled to the first and second angled vertical supports 132, 134 at bottom ends thereof and similarly, one of the cross-supports 135 is a top cross support extends between and is coupled to the first and second angled vertical supports 132, 134 at top ends thereof. Each of the first and second upright frames 130, 140 is widest at the bottom end.

As shown in the figures, each of the first and second upright frames 130, 140 is securely attached to the base platform 120 and in particular, is securely attached to the base station 122. The bottom cross-support 135 is attached along one side support of the base station 122 using conventional means, such as using fasteners, etc. For example, a bracket can be used to the mount the first and second upright frames 130, 140 to the respective side supports.

It will be appreciated that the first and second upright frames 130, 140 can be formed of a plurality of interconnected sections to allow a breakdown of the assembly for a more compact storage. For example, the interconnected sections can be connected to one another using conventional means, such as the use of fasteners, brackets, and/or male/female coupling structures.

The upright back wall 150 extends between the first and second upright frames 130, 140 and provide a rear support structure. FIGS. 4A-4D illustrate the upright back wall 150. The upright back wall 150 is an elongated structure and the width of the upright back wall 150 is sized relative to the forward transverse support of the foldable extension 127. The upright back wall 150 is formed a plurality of plates 151 which are preferably, heavy duty foldable plates. As shown in the front views of FIGS. 4A and 4B, the front surface (face) of the upright back wall 150 includes a pair of spaced gliding rails 152 that protrude outwardly from the plates 151. The gliding rails 152 are spaced apart from one another and are parallel to one another. The gliding rails 152 are thus raised tracks that function as described below. As shown in the figures, each gliding rail 152 can include side notches 153. Between the gliding rails 152, there is a center track 155. The center track 155 is defined by a flat, planar surface. The center track 155 can be slightly raised relative to adjacent portions of the back wall 150.

In addition, along the upright back wall 150 there are a plurality of locking pin locations 157 (see FIG. 2B). The locking pin locations 157 are formed along a length of the upright back wall 150 at spaced distances. As shown, the locking pin locations 157 can be formed along the center track 155. While a pair of locking pin locations 157 are shown in FIG. 2B, there are can be more than two locations 157.

It will be understood that, at least in one embodiment, the upright back wall 150 can be formed of a number of different sections that are interconnected with one another to form the assembled structure shown in the figures. The sections can be interconnected with one another using conventional means including mechanical attachment, such as use of brackets, hinges, fasteners, etc. In one embodiment, the upright back wall 150 is formed of foldable sections.

FIGS. 5A-5E illustrate the top cross member 160 which can be in the form of a top cross plate. The top cross member 160 is configured to secure the frame assembly. The illustrated top cross member 160 is in the form of a plate 162 which in this case has a rectangular shape and has a top surface and an opposing bottom surface. The shape and size of the top cross member 160 are selected in view of the shapes and sizes of the other frame components. Along the bottom surface there is a plurality of hollow posts 164 that extend outwardly therefrom. The hollow posts 164 can be formed at a right angle to the bottom surface. As shown, the two hollow posts 164 are spaced apart with one formed proximate one end of the plate 162 and the other formed proximate the other end of the plate 162. Along the top surface of the plate 162, the hollow posts 164 are freely open to allow insertion of an umbrella shaft therein to hold the umbrella upright above the user. The posts 164 can thus be thought of as being cup like structures that receive the umbrella shafts. Between the posts 164, along the bottom surface, is a harness latching point 165 defined by a looped structure (e.g., U-shaped structure in which both legs are attached to the bottom surface). The harness latching point 165 is configured such that its opening is formed perpendicular to a longitudinal axis of the plate 162.

FIGS. 6A-6D illustrate one foldable hinge 170. The foldable hinge 170 is defined by a first plate 172 and a second plate 174. The two plates 172, 174 partially overlap a rivet 175 passes through both plates 172, 174 to join the plates 172, 174 and allow them to swivel (pivot) relative to one another. Each plate 172, 174 can include one or more mounting holes 176. As shown, the holes 176 can be axially aligned with the rivet 175.

The frame assembly also includes strapping points 180 which are shown in FIGS. 2C and 2D. The strapping points 180 can be arranged in pairs at locations spaced along height of the back wall. For example, the strapping points 180 can be formed along proximate the side edges of the back wall. The strapping points 180 can be in the form of hooks or the like. For example, U-shaped hooks or D-shaped hooks can be used. These hooks (strapping points) 180 extend outwardly from the rear of the back wall. The locations of the sets of strapping points 180 can vary along the height of the back wall.

The frame assembly also includes the cart handle 190 and more particularly, can include a pair of cart handles 190. The cart handle(s) 190 are mounted along the rear of the back wall.

Any number of different types of cart handles 190 can be used. For example, the illustrated cart handles 190 are generally L-shaped, with the short leg pointing downward to be grasped by the user's hand. The cart handles 190 allow the user to move and transport the assembly as described herein.

FIGS. 7A-7D illustrate a seat assembly 200 that is operably coupled to the other components of the tree stand 100. Similar to the frame assembly, the seat assembly 200 is formed of a number of components. For example, the illustrated seat assembly 200 includes a back support 210, a seat base 220, a seat base and leg platform support 230, a leg platform 240, a controller arm 250, a seat foundation 260, and a plate attachment 270 (FIGS. 10A and 10B).

The back support 210 can be in the form of an upright/upstanding structure and in the illustrated embodiment, is defined by a curved transverse member (rail) 212 and a pair of upstanding posts 214. The pair of pots 214 is located at the two ends of the curved transverse member 212 and thus are spaced apart from one another.

The seat base 220 is a frame formed of a number of support members. The seat base 220 can be formed of a front frame member 221, an opposing rear frame member 222, and a pair of side frame members 223 that connect the front and rear frame members 221, 222. The rear frame member 222 can have a curved shape complementary to the curved shape of the rail 212. An opening is formed between the frame members 221, 222, 223.

As shown in FIG. 8A, the seat base 220 includes a seatbelt 224 that is secured along one side frame member 223. A complementary seatbelt lock 225 is disposed along the opposite side frame member 223 opposite the seatbelt 224. Along the rear frame member 222, a limit switch 226 is provided.

The seat assembly 200 also includes a seat base and leg platform support 230. The seat base and leg platform support 230 includes a pair of vertical supports 232 that are spaced apart and are parallel to one another. The pair of vertical supports 232 is attached to the seat base 220 using conventional techniques, including but not limited to the use of brackets and/or fasteners, etc. Bottom ends of the vertical supports 232 are attached to the leg platform 240. As shown, the leg platform 240 can be in the form of a plate on which the user's feet rest during use. The leg platform 240 can come in any number of different shapes and sizes. In the illustrated embodiment, the leg platform 240 has a tapered construction in that it tapers outwardly in a direction away from the seat base 220. The leg platform 240 can be a perforated structure in that it includes a series of openings formed therein. The platform 240 is formed at a right angle relative to vertical supports 232.

The seat assembly also includes the controller arm 250 which is disposed above the seat base 220 along one side thereof. The controller arm 250 includes a vertical support 252 that attaches the controller arm 250 to the base section 220 and more particularly to one side frame member 223. The controller arm 250 extends forwardly along the side support of the seat base 220. The controller arm 250 also includes an arm rest 252 that is also shown in FIGS. 9A-9D. The arm rest 252 is an elongated structure that has a top surface on which the user's arm can rest. The arm rest 252 can include padding on which the user's arm rests. At one end of the arm rest 252, the arm rest 252 can include a digital touch screen 253. The digital touch screen 253 can be a pivotable structure and can pivot between an open position and a closed position. The arm rest 252 lies parallel to the base section 220.

The controller arm 250 also includes a number of user controls and in particular, the controller arm 250 can include a joystick 255 that extends upwardly from the controller arm 250. Manipulation of the joystick 255 allows for control over the seat assembly and as described herein, when the user moves the joystick in one direction, the seat assembly will move in a corresponding direction. If the user moves the joystick in another direction, the seat assembly will move in a different corresponding direction. The controller arm 250 also includes one or more buttons 256 that also are part of the operating system and when depressed, causes the seat assembly to undergo a corresponding action.

The controller arm 250 optionally includes a foldable cup holder 257. The foldable cup holder 257 is disposed along an outer side edge of the arm rest 252. The foldable cup holder 257 can be in the form of a flat plate with a center opening formed therein to receive and hold a cup. FIG. 8B shows the foldable cup holder 257 in the in-use extended position. The controller arm 250 also includes a foldable gun rest/rack 258 that is coupled to but spaced from the arm rest 252. As shown, the foldable gun rest/rack 245 is coupled to the arm rest 252 (e.g., as by being coupled to an underside thereof) and extends outwardly from the arm rest 252. The illustrated foldable gun rest/rack 258 is connected to the arm rest 252 by an arm that is disposed generally perpendicular to the side of the arm rest 252 and a vertical support member (post) extend upwardly from the perpendicular arm and includes a gun receiving upper end 259 (e.g., a U-shaped structure defining an opening between the parallel legs for receiving and orienting a gun and allow it to rest therein). In one embodiment, the gun rest/rack 258 is laterally movable within an integral to allow the user to position it in a desired position and a locking feature can be provided to lock the gun rest/rack 258 in a desired position.

One exemplary seat foundation 260 is shown in FIG. 10A. The seat foundation 260 is configured to store a number of the operating parts of the motorized assembly. For example, the seat foundation 260 is coupled to an underside of the seat assembly. The seat foundation 260 thus is in the form of a housing. The seat foundation 260 includes a battery housing 262 that receives and contains a battery 263. The seat foundation 260 is user accessible and therefore, the battery 263 is accessible and can be removed and replaced. The seat foundation 260 also includes a motor housing 264 and more specifically, a second motor 265 is contained within the motor housing 264. As described herein, the second motor 265 is operable to cause a desired motion in the seat assembly. The seat foundation 260 also includes a bearing/swivel plate 266 that is shown in FIG. 7B. The bearing/swivel plate 266 is disposed between the motor housing 264 and the seat base. As shown, the bearing/swivel plate 266 can be a curved structure. The bearing swivel plate 266 is formed of a two layer plate construction with a bottom plate thereof being fixedly attached to the motor housing 264 and a top plate thereof being fixedly attached to the seat base 220 with bearings being provided to allow the top plate to swivel relative to the bottom plate. As described herein, the second motor 265 controls the pivoting (swinging motion) of the seat assembly. The second motor 265 is thus operatively connected to the top plate of the bearing swivel plate 266 as by a coupling between a drive shaft and the top plate such that operation of the motor results in rotation of the drive shaft. Rotation of the drive shaft results in rotation (pivoting) of the top plate relative to the bottom plate of the bearing swivel plate 266 resulting in a pivoting of the seat base 220 and the seat assembly itself. Rotation of the motor's drive shaft in one direction results in pivoting of the seat in a first direction and rotation of the motor's drive shaft in the opposite direction results in pivoting of the seat in a second direction, thereby allowing left/right movement of the seat.

The plate attachment 270 is shown in FIGS. 10A and 10B. The plate attachment 270 is disposed between the back wall and the seat foundation 260. The plate attachment 270 includes a mounting plate 272 which is coupled to the seat assembly. Attached to the plate attachment 270 is a first motor 273 and a driven wheel 274 which is operatively coupled to the first motor 273. As described herein, the first motor 273 controls the up/down motion of the seat assembly. The plate attachment 270 also includes a pair of gliding brackets 276 that are spaced apart from one another and are parallel to one another. The first motor 273 is disposed between the gliding brackets 276. Gliding rail brackets 276 are provided for mounting the seat assembly to the rear wall 150 and more specifically, as shown, the gliding rail brackets 276 are female parts that mate with and engage the gliding rails 152 which comprise male parts. The mating between the gliding brackets 276 and the gliding rails 152 provides stability to the seat assembly as it is driven and also acts as an attachment point between the rear wall 150 and the seat assembly and also acts as a guide track to ensure vertical movement of the seat assembly.

FIGS. 11A-11D illustrate an exemplary folded cart 300. The folded cart 300 is formed of components previously described and in particular is formed of sub-sections of the frame assembly 110. More specifically, the cart 300 includes the base platform 120 and a lower section of the right and left upright frames 130, 140 along with the foldable extension 127. The wheel 123 of the base platform 120 permit the cart 300 to travel over ground and the handles 190 permit the user to grasp the cart 300 and push or pull it once the cart 300 is tilted to elevate the front off of the ground surface. Between the rear wall 150, side frames 130, 140 and the foldable extension 127 in its upright position, a hollow space is formed to receive and transport objects, such as other parts of the tree stand 100. This allows the tree stand 100 to be transported along the ground surface until the chosen tree (to which the tree stand 100 is mounted) is located.

It will be appreciated that there are at least two (2) different types of the cage/platform assemblies, namely, one that is made from metal round tubing that is threaded (male/female) to fit into each other for assembly or disassembly to tear down and the other is made of square tubing bent or welded to the shape shown in FIG. 2A-2E. The individual frame pieces are assembled with custom hinges (See FIGS. 6A-6D) that allow the platform to be foldable. One plate 172 of the hinge 170 is attached to one frame piece and the other plate 174 of the hinge 170 is attached to the other frame piece.

Assembly of the System (Tree Stand) 100

The tree stand 100 can be assembled a following process that includes the following steps.

The base platform 120 (FIGS. 3A-3D) is the foundation of the system 100 and contains the levelling feet 126 to adjust levelling on the ground, front extension 127 (which is folded while the system is disassembled or stored) and the tires 123 for easy roll around.

Once the base platform 120 is set at a desired location adjacent a tree, the right and left frames 130, 140 are installed and fastened to the base platform 120 (i.e., the base station 122 thereof) using fasteners, such as bolts, through the designated welded plates. The complete frame assembly 110 is secured at the top with the top cross member 160.

As described herein the right and left upright frames are formed of a plurality of separate sections that are assembled and coupled to another to form the complete structure. For example, each side can consist of five (5) sections that form the triangular shape of the side frames 130, 140. The five (5) members can be attached with hinges 170 which allow the section to fold and unfold. Each of the sections are also secured with a quick release pins to prevent the members from folding during the operation of the system 100. The quick release pins are preferably located at the center base of each section. Alternatively, as mentioned previously, the frame parts that form the sides 130, 140 can be coupled by male/female coupling elements and fasteners instead of using hinges 170.

Once the two side frames 130, 140 are fully assembled, the top cross member 160 is installed to secure the top and adds stability to the upright frames 130, 140. This member has two cups (hollow posts) 164 to install an umbrella as an option.

The back (rear) wall 150 is ready to be installed. The back wall 250 also preferably is formed of a plurality of sections that are joined to one another to form the assembled back wall 250. For example, the back wall 250 can consist of five (5) sections and each section contains the gliding rails 152, which allow the gliding up and down smoothly, and the drive track 155, which is topped with treaded rubber to create friction for the driven wheel 274 to go up and down. The back wall sections are fastened with fasteners, e.g., bolts, into the upright frames 130, 140.

Now that the frame 110 is fully assembled, it's time to install the seat assembly 200 (FIGS. 7A-7D). As previously mentioned, the seat assembly 200 consists of the seat back support 210, the seat base 220 where the user sits down, the leg platform 240 that allows the user to stand and use it for leg rest. The seat base 220 and the leg platform 240 are attached with seat base and leg platform support 230. The seat base 220 is affixed on the seat mounting base (foundation) 260 which consists of: the battery housing 262, the second motor housing 264 and the seat 220 is attached the base assembly 260 with swivel plate 266 (FIG. 7B). Note: The battery housing 262 is where the source of power (battery 263) is stored and the second motor housing 264 is where second motor 265 is installed. This second motor controls the swing of the seat 220 from one side to another.

There are two (2) different styles of the arm rest, namely, an analog type and a digital type. The analog type is shown in FIGS. 8A-8C and this type controls the system 100 using buttons, to power the system ON/OFF, and 4-way joystick 255 which enables the user to go up/down and from one side to another. It also has the foldable cup holder 257 and the foldable gun rest (rack) 258. The digital type is shown in FIGS. 9A-9*d* and is the same as the analog type, except it controls the system using a foldable and programmed touch screen display 253. The user controls the system 100 with a touch of virtual button and menus that appear on the screen. In this embodiment, which is a computer implemented version, computer hardware is provided, such as a processor, memory, etc., that allow the software program to be executed.

FIG. 15 shows a touch screen display 253 that includes an exemplary graphical user interface. As shown, user inputs can be in the form of a plurality of arrows that reflect and can be labeled as up, down, left and right. In addition a battery status indicator can be provided to show the strength of the battery. In addition, as mentioned herein, the status of the limit switch can be indicated. In addition, other selectable buttons and menus can be provided. It will be appreciated that the software program of the present invention transforms the inputs received on the graphical user interface into control commands that are delivered to the various components to control operation thereof.

Now the seat assembly is complete, it's the time to attach the seat assembly 200 to the system frame 110. The mounting plate 272 (FIG. 10B) is attached to the battery housing 262. The first motor 273 is installed on the mounting plate 272 along with the drive wheel 274. The drive wheel 274 is thus operatively connected to the first motor 273 as by a drive shaft such that operation of the motor 273 results is rotation of the drive shaft and the drive wheel 274 in both a first direction (to move the seat assembly in an upward direction) and an opposite second direction (to move the seat assembly in a downward direction). The drive wheel 274 is in intimate contact with the center track 155 such that it is driven therealong.

After installing the first motor 273 and the drive wheel 274, this assembly gets attached to the gliding brackets 276 (FIG. 10A). The gliding brackets 276 then engage the gliding rails 152 as described herein.

Once all of the components are attached, the entire assembled tree stand 100 can be secured to a strong tree using ratcheted straps. There is a plurality of strapping points 180 on each side of the upright frame. This prevents the system 100 from leaning down or sliding to any direction.

Operation of the System (Tree Stand) 100

Now the system 100 is assembled, installed and secured, the source of power (battery 263) is installed and a power cable is attached. The power cable is connected to a control board (which can be incorporated into the arm rest) at one end and connected to the battery 263 at the other end.

Safety Instruction must be followed at all times.
Turn the Power ON.
Analog Type:
   Push the joystick forward to move up.
   Push down to move down.
   Push to the right to move to the Right Side.
   Push to the left to move to the Left.
Digital Type:
   Press "U" to move UP.
   Press "D" to move DOWN.
   Press "R" Arrow to move to the RIGHT.
   Press "L" to move to the LEFT.
Once the Seat is at the maximum allowed height, depending on the model, there is a limit switch 226 (FIG. 8A) mounted at the back of the seat to prevent the seat from over travelling. In the digital option, there is a light indicator to reflect the status of the limit switch 226 when engaged.
Once the seat is at the top, the operator inserts a quick release pin to the reinforced hole 157 (FIG. 2B) at the top of the back wall 150 to prevent the seat from dropping in case of malfunction or misuse. This is used as a secondary safety device.
The operator will secure his/her own safety by hooking his/her safety harness to the top latch point 165 as shown in (FIG. 5C).

FIGS. 12A-12D illustrate an alternative cage structure 400. The cage structure 400 is made of threaded metal tubing members that can be fastened (screwed) together for assembly and unscrewed for disassembly.

The cage structure 400 comprises a frame 410, a pair of side support members 420, a top plate 430 and a bottom plate 440.

The side support members 420 add to the strength of the structure 400 and also can be used as ladder in case of accidental fall to climb up or down. The seat assembly 200 is still the same as is the rest of the components shown in FIGS. 1A and 1B including the rear wall 150.

FIGS. 13A-14C illustrate a rotating and swinging tree stand 500 that is intended to act as a standalone unit. The tree stand 500 is not coupled to a frame assembly and therefore, lacks the motorized vertical movement described with reference to the tree stand 100. The tree stand 500 is intended to be mounted directly to the tree and uses an alternative seat assembly 510 that does provide a motorized swivel (left/right) movement. The seat assembly 510 can thus be used independently by itself as a rotating and swinging hunting tree stand. It provides the option of changing position while the hunter remains seated, utilizing the previously mentioned control processes.

The seat assembly 510 includes a seat to tree support bracket 520, a strapping member 530, and strapping points 540. The strapping member 530 seats directly against the tree and straps (mounting equipment) are received through the points (holes) 540 to attach the stand 500 to the tree. As shown, the strapping member 530 can be pivotally coupled to the bracket 520 (as by a vertical shaft) to allow pivoting of the strapping member 530 to accommodate different sized (different widths) trees. Both strapping members 530 can thus be pivoted to accommodate the trunk of the tree. The strapping members 530 are thus pivoted until they are in a position in which they securely seat against the tree trunk.

The stand 500 includes the seat foundation 260 including the second motor 265 which is operatively connected to the swivel plate 266 to cause controlled movement of the seat base 220 and thus the seat assembly 200 as described above.

The present invention is designed to offer the operator functions that are not available in commercially available tree stand systems. It provides the operator with many options such as elevating up or down, rotating and swinging from one side to another with a push of a button or a joystick. It also enables folks with limited ability to climb up or down a tree stand and enjoy hunting or bird watching.

This system provides the operator the ability to swing and rotate from one side to another. As explained earlier, it gives the operator the chance of changing position without compromising their own safety. Just with a push of a button they can select to change the position/direction to have better visibility and clearance to their target while seated.

It also offers additional safety aspects, such as using the sides as a ladder to free themselves from being stranded in the middle of the forest suspended by their harness, were it may cuts the blood supply to various parts of the body. The use of the seatbelt 224 while moving, prevents the operator from falling accidently. The harness latching point 165 is built in, so they don't have to climb a ladder and reach the top to place a strap on the tree, and then latch their harness to it. These can be a major safety issues which are overcome by using the present system.

Wheelchair Compatibility

In accordance with one aspect of the present invention, the electrically controllable tree stand 100 can be modified to permit use with a wheelchair 10. As is known, a traditional wheelchair 10 includes a chair frame and seat 20 and a pair of spoked wheels 30.

In order to convert the tree stand 100 into a system that is configured to receive and operate with a wheelchair 10, the seat assembly 200 is removed and a wheelchair accessory 600 is installed in its place. FIGS. 16-18 show the wheelchair 10 coupled to the wheelchair accessory 600 that is installed on the tree stand 100.

FIGS. 19-29 illustrate the wheelchair accessory 600 according to one embodiment. As described herein, the wheelchair accessory 600 is configured such that the wheelchair 10 can be securely attached thereto and be controllably raised and lowered along the height of the tree stand 100. As described herein, the wheelchair accessory 600 is configured to receive wheelchairs of different widths.

The wheelchair accessory 600 includes a first fork (side plate) 610 and an opposing second fork (side plate) 620. The first fork 610 and the second fork 620 can thus be mirror images of one another and therefore, only the first fork 610 will be described in detail since one of skill in the art will readily understand that the second fork 620 has an identical construction and is labeled accordingly with the same reference legends. Each of the first fork 610 and the second fork 620 has a front end 630 and an opposing rear end 632.

As described herein, the rear end 632 can be attached to a structure that is driven up and down under action of a motor as described herein. As illustrated, the rear end 632 can include a mounting flange 635 that is formed at a right angle to the main portion of the fork 610, 620. The mounting flange 635 can represent a mounting bracket that is positioned flush against a surface to which the accessory 600 is to be mounted. The mounting flange 635 can have one or more and preferably, a plurality of holes that receive fasteners for mounting the accessory 600 to the mounting surface.

Each of the first fork 610 and the second fork 620 can have a tapered construction in that a height of each is greater at the rear end 632 compared to the front end 630. Each of the first fork 610 and the second fork 620 is defined by a top edge 631 and an opposing bottom edge 633. In use, the top edge 631 is oriented such that is represent a planar surface that is parallel to a level ground surface, while the bottom edge 633 is set at an angle. Along the top edge 631 closer to the front end 630, a wheelchair isolation groove 640 is formed. The groove 640 is thus open along the top edge 631 and a bottom of the groove 640 has a concave shape. As shown, the groove 640 can have an asymmetric shape.

The accessory 600 also includes a locking brake plate member 650 that is configured to lock the wheel 30 into the groove 640 and secure the wheelchair 10 to the accessory 600. The locking brake plate member 650 is formed of a number of complementary parts/features. In particular, the locking brake plate member 650 includes a brake plate 652 that is intended to cover the open top of the groove 640 and more specifically, can is configured to extend along and be detachably coupled to the top edge 631. The brake plate 652 can thus be in the form of an elongated plate strip. The brake plate 652 is coupled to the top edge 631 using any number of techniques, including the use of fasteners, such as screws, etc. that pass through openings 633. The ends of the brake plate 652 thus seat against the top edge 631 while an intermediate portion thereof lies over the open top of the groove 640 so as to cover the groove 640.

It will be understood that since the locking brake plate member 650 is intended to be repeatedly installed and detached from the accessory 600, any number of techniques can be used that allow for such action. For example, quick connector connectors or other types of connectors can be used to connect the brake plate member 650 to the accessory 600.

As best shown in FIGS. 24 and 25, the locking brake plate member 650 also includes a block structure or member 660 that acts as a brake to prevent the wheels 30 on the wheelchair 10 from spinning. The block 660 can be formed of any number of different materials, including but not limited to rubber or a synthetic material having similar material characteristics. The block 660 has a concave shaped recess 662 in a middle portion thereof that faces downward towards the bottom of the groove 640. On either side of the concave shaped recess 662 there can be downwardly extending spring loaded rods (pins) 665. The spring loaded rods 665 extend downwardly toward the concave shaped recess 662. The spring loaded rods 665 are secured to the brake plate 652 and in particular, pass through the block 660 and can be secured by use of bolts 667 (which also adjust tension on the wheelchair 10). The biasing elements (e.g., springs) 669 are disposed about the rods (pins) 665 and one end of the springs 669 seat against the block 660 and apply a biasing force to the rods 665 to cause extension of the rods 665 unless a force is applied to the rods 665 to cause compression thereof.

In order to accommodate different sized wheelchairs 10, the accessory 600 includes a first adjustable plate 670, which can be thought of as being a left side plate, and a second adjustable plate 680, which can be thought of as being a right side plate. The first adjustable plate 670 is coupled to the first fork 610, while the second adjustable plate 680 is coupled to the second fork 620. The first adjustable plate 670 is securely attached to the top edge 631 of the first fork 610 and extends inwardly therefrom and the second adjustable plate 680 is securely attached to the top edge 631 of the second fork 620 and extends inwardly therefrom. As shown, each of the first adjustable plate 670 and second adjustable plate 680 is disposed at the rear end 632 of the respective fork 610, 620.

As shown, each of the first adjustable plate 670 and the second adjustable plate 680 has a notch 681 that is formed therein and is located adjacent the fork. The notch 681 opens in a forward direction. The plate 670, 680 also includes a plurality of slots 690. The slots 690 are formed proximate the free outer end of the respective plate 670, 680. The slots 690 extend longitudinally. The slots 690 can be in the form of two slots 690 that are spaced apart and are oriented parallel to one another. As described below, the slots 690 permit width adjustment of the accessory 600. The accessory 600 further includes a swivel plate 700 that serves to couple one half (one side) of the accessory 600 to the other half (other side). The swivel plate 700 has a plurality of fasteners or coupling members 710 that extend upwardly from a top surface of the swivel plate 700. The number of coupling members 710 formed on the swivel plate 700 is equal to the number of slots 690 and the locations of the coupling members 710 is complementary to the locations of the slots 690 to allow reception of one coupling member 710 into one slot 690. The reception of the coupling members 710 into the slots 690 permit the two halves of the accessory 600 to be moved laterally so as to either increase the distance between the two halves or reduce the distance between the two halves. This movement allows for the width of the accessory 600 to be varied.

The accessory 600 also includes a control arm coupling member 720 that is configured to permit a control unit, such as the control arms described herein, to be easily coupled to one of the forks 610, 620. Each fork 610, 620 near the front end 630 thereof has one control arm coupling member 720 formed therein. The control arm coupling member 720 can be in the form of a hole or the like that receives a complementary protrusion that is received within the hole to couple the control arm to the accessory 600.

As described herein, the wheelchair attachment forks 610, 620 are attached at the motor housing 264 and are attached to the swivel plate 700 (which allows the wheelchair 10 to swivel from right to left and vice versa).

To assemble the accessory 600 to the tree stand 100, the seat assembly 200 is removed and then the accessory 600 is installed on the motor housing 264 and then the assembled forks 610, 620 and the motor housing 264 are attached to the mounting plate 272 to the back wall and the gliding rails 152. The control arm 250 is then installed to the coupling member (hole) 720 on either side (depending upon the handedness of the user) to allow control of the system.

The user lower the fork assembly below the axel(s) of the wheelchair 10. The user then backs up the wheelchair 10 into the tree stand frame assembly and places the wheelchair 10 into the wheelchair isolation groove 640. The user then jogs the fork assembly slowly upward (using the control system or the like) to cause vertical movement of the fork assembly results in contact between the wheelchair axle and the fork assembly (i.e., the bottom of the groove 640). Next, the locking brake plate members 650 are installed to lock the wheels 30 into the corresponding grooves 640 and secure the wheelchair 10. The user has the option of controlling the system with a controller, which as described herein can be in the form of a digital touch screen or an analog system using a joystick to control the system.

Ball Screw Drive Mechanism

In yet another embodiment, shown in FIGS. 30-40, an alternative drive system is employed for controllably moving a structure, such as the seat assembly 200 or wheelchair accessory 600, that supports the user. The alternative drive system is incorporated into a tree stand 800. It will therefore be understood that the seat assembly 200 that can swivel can be incorporated into the tree stand 800 and driven by the alternative drive system associated therewith.

The tree stand 800 has a base 802 that is generally shown and can take any number of different forms including those described and illustrated previously. A first vertical support wall 810 is coupled to the base 802 and includes a sliding rail 812 that extends longitudinally therealong. The first vertical support wall 810 can include a deck 813 that is mounted thereto and extends horizontally. Below the deck 813, there is a utility housing 821. The utility housing 821 is open and permits storage of working components, such as battery 822 and motor 824.

The tree stand 800 also includes a vertical ball screw drive structure. The vertical ball screw drive structure includes a second vertical support wall 820. The first and second vertical support walls 810, 820 can be arranged side-by-side was shown. The second vertical support wall 820 includes a rotatable threaded shaft 840 that is driven by motor 824 and as described herein is operatively coupled thereto. At the opposite end, the threaded shaft 840 is operatively coupled to a top bearing housing 841 to permit rotation of the threaded shaft 840. The threaded shaft 840 is spaced from the second vertical support wall 820 and extends longitudinally thereto.

The second vertical support wall 820 is configured to support a plurality of brake blocks 860 in spaced relationship along a length thereof. The brake blocks 860 are fixedly attached to the second vertical support wall 820. The functionality of the brake blocks 860 are discussed below. As shown in FIG. 36, the brake block 860 is generally U-shaped and includes a first leg 862, an opposing second leg 863 and a cross member 864 extending between the first leg 862 and the second leg 863. At a top edge of the first leg 862 is a first inwardly extending flange 865 and at a top edge of the second leg 863 is a second inwardly extending flange 866. A shoulder is thus formed between the flange and the respective leg. Each of the first flange 865 and the second flange 866 includes a through hole. The cross member 864 includes a plurality of mounting holes to allow the brake block 860 to be mounted to the second vertical support wall 820. In particular, the cross member 864 is seated flush against and is mounted to the second vertical support wall 820 at fixed locations therealong. Fasteners can pass through these through holes to fixedly attach the brake block 860 to the second vertical support wall 820 at the fixed location. The brake blocks 860 are thus fixed and stationary.

The tree stand 800 also includes a threaded block 870. The threaded block 870 is defined by a main body 872 that has a first end 873 and an opposing second end 874. The main body 872 has two different thicknesses with a first end portion that terminates at the first end 873 being thicker than a second end portion that terminates at the second end 874. The first end portion is more block shaped and a threaded opening 875 is formed therethrough. The threaded opening 875 is complementary to the threaded shaft 840. The top and bottom surfaces of the threaded block 870 are smooth planar surfaces that are parallel one another. The threaded block 870 includes multiple protrusions and in particular, includes a first set of protrusions 878 that are formed in the first end portion and are proximate to and on either side of the threaded opening 875. The threaded block 870 also includes a second set of protrusions 877 that are formed in the second end portion proximate the second end 874. The protrusions 877 are spaced further apart than the protrusions 878.

Unlike the stationary brake block 860, the threaded block 870 is a movable object as described herein.

The threaded block 870 and the brake block 860 are meant to complement one another as described herein and in particular, in select circumstances, the threaded block 870 is driven into engagement with one corresponding brake block 860. In particular, for each threaded block 870 there is one brake block 860 that is specifically configured to mate only with that particular threaded block 870 to prevent further axial movement of that threaded block 870. More specifically, the width of the brake blocks 860 are different in that the distance between the opposing legs and flanges varies from one brake block 860 to the other. For those threaded blocks 870 that are intended to pass through the brake block 860, the opposing flanges are sufficiently spaced apart such that the second end portion and the protrusions 877 do not engage the flanges but instead pass therebetween. When a given threaded block 870 contacts its respective brake block 860, the width of the second end portion is such that the protrusions 877 associated therewith are received within the holes in the first and second flanges of the brake block 860. When this occurs, the fixed (stationary) brake block effectively "brakes" and restricts vertical movement of the threaded block 877.

The tree stand 800 also includes an attachment plate 900 that is configured to move vertically along the sliding rail 812 and represents the mounting plate to which the seat assembly 200 or the wheelchair mounting assembly is attached. More specifically, as shown in FIGS. 30, 31 and 33, the attachment plate 900 is attached on its backside to a sliding block 890 that is coupled to and rides vertically along the sliding rail 812. The attachment plate 900 is also attached to the threaded block 870 and therefore, as the threaded block 870 is driven vertically under action of the threaded rod 840, the attachment plate 900 is likewise driven vertically along the sliding rail 812. The sliding rail 812 adds support and stability to the moving load and offers a smooth ride.

As described herein, the threaded block 870 has two functions, namely, 1) it is threaded to interact to the motion of the threaded rod 840 (e.g., if the threaded rod 840 spins forward, the threaded block 870 moves up and vice versa; and 2) it supports the attachment plate 900 from one side and therefore, the attachment plate 900 can be bolted from the right side and the left side.

A cover can be provided to cover and shield certain components. For example, the cover can be a Lexan cover that provides multiple functions to this assembly. One is to become a guide to the additional threaded blocks 870 when they reach the brake blocks 860 so they don't spin out. Also, it locks and keeps inline the threaded blocks 870 when they reach the brake blocks 860. Also, it minimizes the noise of the spinning shaft 840. The cover also keeps the system clean.

As described herein, the operation of the tree stand 800 is as follows. The motor 824 is turned on and a control button (which can be part of the controller) is pressed to move forward the threaded rod 840 spins and allows the seat assembly 200 or the wheelchair to move up due to it being attached to a driven attachment plate 900. As the seat travels upward, there are additional threaded blocks 870 that travel along with the seat or wheelchair. The brake block 860 at predefined intervals (e.g., every x number of feet) or marked distances to stop and lock the threaded blocks 870 to add additional strength and support the structure. As mentioned, the threaded blocks 870 have different widths and the brake blocks 860 have different open space to allow only one block 870 to stop and lock according to the width of the threaded block 870. Thus, the narrower ones go through a wider opening till they meet with a less opening space to stop. The protrusions (pins) 877 mate with holes in the brake block 860 to prevent them from spinning freely. This will add more stability to the length of the threaded rod 840. When the down control button is pressed, the threaded rod 840 spins in reverse causing the seat assembly 200 or the wheelchair to descend. While descending, the threaded blocks 870 will move downward with the seat as well.

The protrusions 878 of the threaded block 870 are designed to be received within complementary holes that are formed on the underside of an above threaded block 870. It will be understood that during descent of the attachment plate 900, the threaded block 870 attached thereto engages the threaded blocks 870 that are located below the threaded block 870 that is attached to the attachment plate 900. The protrusions 878 allow for the nesting of the threaded blocks 870 during the descent which adds stability and support of the seat assembly or wheelchair during descent.

The tree stand 800 is very diverse and provides the user with many options including the follows: 1) offers various options to different types of lift mechanism; 2) attaches to a seat, platform or wheelchair, 3) uses only the seat assembly to attach to a tree and benefit from the rotating and swing mechanism described herein; and 4) the platform is foldable and can be converted into a hand cart or the like.

It will be understood that the various components described herein can be formed of any number of suitable materials, including rigid plastics and metals and even wood and the seat can include cushioning, etc.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A motorized tree stand comprising:
   a frame assembly for attachment to a tree, the frame assembly including a first vertical support and a second vertical support wall spaced proximate the first vertical support;
   an attachment plate coupled to the first vertical support and being configured to mount to a seat assembly that provides a seat on which a user can sit, the attachment plate being vertically driven along the first vertical support;
   a drive assembly in a form of a rotatable threaded rod that is coupled to the second vertical support and is operatively connected to a first motor for controlled rotation thereof, the drive assembly including a threaded block that is threadingly mated to the threaded rod such that rotation of the threaded rod causes movement of the threaded block in a first direction along the threaded rod and rotation of the threaded rod in a second direction causes movement of the threaded block in an opposite second direction along the threaded rod, the threaded block being connected to the attachment plate such that movement of the threaded block is translated into movement of the attachment plate;
   a controller operatively connected to the drive assembly; and
   a power source connected to the drive assembly and the controller.

2. The motorized tree stand of claim 1, wherein the seat assembly is mounted to the attachment plate and further including another drive assembly that is coupled to the seat assembly and configured to controllably swivel the seat assembly relative to the frame assembly.

3. The motorized tree stand of claim 1, wherein the first vertical support includes a contoured first rail that extends longitudinally therealong, the attachment plate being coupled to a contoured sliding block that slides vertically along the first rail.

4. The motorized tree stand of claim 1, wherein the second vertical support and the first vertical support are oriented side-by-side.

5. The motorized tree stand of claim 1, wherein the second vertical support contains a plurality of brake blocks that are fixedly attached thereto at spaced intervals from one another, each brake block configured to selectively engage one threaded block to prevent further axial movement of the one threaded block.

6. The motorized tree stand of claim 5, wherein there are a plurality of threaded blocks arranged along the threaded rod, each threaded block being axially movable along the threaded rod.

7. The motorized tree stand of claim 6, wherein an uppermost threaded block is attached to the attachment plate such that movement of the threaded block along the threaded rod is directly translated into movement of the attachment plate.

8. The motorized tree stand of claim 6, wherein each brake block has a pair of legs that define a space therebetween, each leg including a hole, wherein an uppermost brake block is configured to engage and prevent further axial movement of an uppermost threaded block, the uppermost threaded block having a pair of posts that are received within the holes, wherein at least one other brake block located below the uppermost brake block has a space between the legs that permits the uppermost threaded block to pass therethrough.

9. The motorized tree stand of claim 8, wherein one of the threaded blocks located below the uppermost threaded block is configured to engage and have its axial movement stopped by the at least one other brake block.

10. The motorized tree stand of claim 6, wherein one or more of the threaded blocks has a pair of upstanding pins that are received within holes of one of the threaded blocks located immediately above the threaded block, thereby coupling the two threaded blocks during a downward driving action thereof.

11. The motorized tree stand of claim 6, wherein at least one or more of the threaded blocks is defined by a body having a first portion having a first thickness and an adjacent second portion having a second thickness which is greater than the first thickness, the second portion having a threaded bore formed therethrough for threadingly receiving and engaging the threaded rod.

12. The motorized tree stand of claim 11, wherein the first portion has a pair of upstanding first posts and the second portion has a pair of upstanding second posts, the pair of first posts being configured to be engage a fixed brake components that defines an end of travel of the threaded block when the threaded block engages the brake component.

13. The motorized tree stand of claim 1, further including another drive assembly and the seat assembly includes a seat base and a seat foundation and a plate attachment for coupling the seat assembly to the attachment plate and permit vertical movement of the seat assembly along the first vertical support, wherein the other drive assembly and a dedicated second power source are disposed within the seat foundation.

14. The motorized tree stand of claim 13, wherein the seat foundation includes a housing that includes a first portion for containing a battery which comprises the second power source and a second portion for containing a motor that is part of the other drive assembly, the motor being operatively coupled to seat base for controllably swiveling the seat base.

15. The motorized tree stand of claim 14, wherein the seat foundation further includes a bearing swivel plate formed of a first bottom plate that is fixedly attached to the housing of the seat foundation and a second top plate that is fixedly attached to the seat base, the first bottom plate and the second top plate being pivotally coupled to one another, the motor being operatively coupled only to the second top plate such that operation of the motor causes swiveling of the seat base.

16. The motorized tree stand of claim 1, further including a wheelchair accessory that is configured to be coupled to the attachment plate, the wheelchair accessory being defined by first and second forks that are spaced apart from one another and each includes a wheelchair isolation groove for receiving a respective wheel of the wheelchair, the wheelchair accessory further including a pair of locking brake plate members that are configured to lock one respective wheel into the respective wheelchair isolation groove and secure the wheelchair to the accessory.

* * * * *